United States Patent
Liu et al.

(10) Patent No.: US 11,902,450 B2
(45) Date of Patent: Feb. 13, 2024

(54) BLOCKCHAIN GENERATION METHOD AND SYSTEM, AND RELATED DEVICE

(71) Applicant: HUAWEI TECHNOLOGIES CO., LTD., Guangdong (CN)

(72) Inventors: Xun Liu, Hangzhou (CN); Jian Ding, Hangzhou (CN); Zhao Cao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 854 days.

(21) Appl. No.: 16/992,455

(22) Filed: Aug. 13, 2020

(65) Prior Publication Data

US 2020/0374133 A1 Nov. 26, 2020

Related U.S. Application Data

(63) Continuation of application No. PCT/CN2019/074531, filed on Feb. 2, 2019.

(30) Foreign Application Priority Data

Feb. 14, 2018 (CN) .......................... 201810154027.4

(51) Int. Cl.
*G06F 21/00* (2013.01)
*H04L 9/32* (2006.01)
(Continued)

(52) U.S. Cl.
CPC ........ *H04L 9/3247* (2013.01); *G06F 21/6245* (2013.01); *G06Q 20/3825* (2013.01)

(58) Field of Classification Search
CPC ..... H04L 9/3247; H04L 9/40; G06F 21/6245; G06F 21/64; G06Q 20/3825; G06Q 40/04
See application file for complete search history.

(56) References Cited

U.S. PATENT DOCUMENTS

2017/0230189 A1* 8/2017 Toll .......................... G06F 21/54
2018/0285869 A1 10/2018 Li
(Continued)

FOREIGN PATENT DOCUMENTS

CN 106372941 A 2/2017
CN 106503995 A 3/2017
(Continued)

OTHER PUBLICATIONS

Elli Androulaki et al, "Hyperledger Fabric: A Distributed Operating System for Permissioned Blockchains", arxiv.org, Cornell University Library, 201 Olin Library Cornell University Ithaca, NY 14853, Apr. 2018, total 16 pages.
(Continued)

*Primary Examiner* — Kendall Dolly

(57) ABSTRACT

A method for blockchain generation is provided. The method includes: sending, by a client, transaction information to a first node device, where the transaction information includes basic information and digest information; receiving, by the client, an endorsement result sent by the first node device, where the endorsement result includes a signature generated after the first node device successfully performs transaction simulation; and if the endorsement result meets a preset transaction condition, sending, by the client, the digest information and the endorsement result to a second node device, so that the second node device sends, to the first node device the digest information to generate a complete blockchain. In this way, only the digest information is transmitted between the first node device and the second node device. Therefore, the second node device does not obtain the complete transaction information, so that information security is improved.

15 Claims, 14 Drawing Sheets

(51) Int. Cl.
  *G06Q 20/38* (2012.01)
  *G06F 21/62* (2013.01)

(56) References Cited

U.S. PATENT DOCUMENTS

| | | | |
|---|---|---|---|
| 2020/0202352 A1* | 6/2020 | Li | H04L 9/3239 |
| 2020/0322136 A1* | 10/2020 | Irazabal | H04L 9/50 |
| 2021/0126787 A1* | 4/2021 | Sen | H04L 9/3247 |
| 2021/0142324 A1* | 5/2021 | Li | G06Q 20/12 |
| 2021/0209682 A1* | 7/2021 | Jain | H04L 9/3239 |
| 2021/0240673 A1* | 8/2021 | Novotny | H04L 67/104 |
| 2021/0297253 A1* | 9/2021 | Irazabal | G06F 16/2365 |

FOREIGN PATENT DOCUMENTS

| | | |
|---|---|---|
| CN | 106656974 A | 5/2017 |
| CN | 107395557 A | 11/2017 |
| CN | 107451874 A | 12/2017 |
| CN | 107493162 A | 12/2017 |
| WO | 2017182601 A1 | 10/2017 |
| WO | 2018020944 A1 | 2/2018 |

OTHER PUBLICATIONS

EPO Communication extended European Search Report in Application No. 19753677.4 dated Feb. 16, 2021, 11 pages.
Satoshi Nakamoto et al. "Bitcoin: A Peer-to-Peer Electronic Cash System", retrieved from the internet:https://bitcoin.org/bitcoin.pdf, on Sep. 3, 2020. total 9 pages.
Notice of Allowance issued in CN201810154027.4, dated Nov. 9, 2022, 5 pages.

* cited by examiner

BLOCKCHAIN GENERATION METHOD AND SYSTEM, AND RELATED DEVICE

CROSS-REFERENCE TO RELATED APPLICATIONS

This application is a continuation of International Application No. PCT/CN2019/074531, filed on Feb. 2, 2019, which claims priority to Chinese Patent Application No. 201810154027.4, filed on Feb. 14, 2018. The disclosures of the aforementioned applications are hereby incorporated by reference in their entireties.

TECHNICAL FIELD

This application relates to the field of Internet technologies, and in particular, to a blockchain generation method and system, and a related device.

BACKGROUND

A blockchain technology is essentially a distributed database technology in which an ever-increasing quantity of tamper-resistant data records that can be shared can be maintained by retaining a chain structure of data blocks. The core of the blockchain technology is that all currently participating nodes maintain a transaction and a database together. In the blockchain technology, the transaction is based on a cryptography principle instead of trust, so that any two parties that reach an agreement can directly conduct a payment transaction without participation of a third party. The participating nodes include a peer and an orderer. After initiating a transaction, the peer performs transaction simulation based on a smart contract. The transaction simulation is mainly used to verify validity of the transaction. The orderer may determine a transaction sequence in a blockchain, to ensure orderly transactions.

Although a concept of the blockchain derives from a bitcoin system, the blockchain technology can do much more than a cryptocurrency. From the perspective of a service, tangible products such as automobiles, real estate, and food and intangible assets such as bonds, private equity, and securities all seek the decentralized blockchain technology, and an enterprise-level blockchain system emerges as required. Different from the bitcoin system, the enterprise-level blockchain system has the following three features: 1. Be applicable to various services in addition to the cryptocurrency by using a turing complete smart contract. 2. Protect transaction privacy but allow auditing. 3. Selectively perform transaction verification without participation of all nodes.

Currently, to protect transaction privacy, a concept of a channel is provided in the enterprise-level blockchain system. Different peers can join only a specified channel based on permission. Transaction data can be shared between peers on a same channel, but transaction data on different channels is isolated from each other. In other words, if two peers belong to different channels, then their data is invisible to each other. In this case, a mechanism for preventing a transaction from being viewed by a peer unrelated to the transaction is provided, so that transaction privacy is protected.

However, in the channel mechanism, a transaction privacy problem can be effectively resolved on a peer side, but an orderer can still view all transactions. To be specific, if an organization provides both a peer and an orderer, the organization can still view all transaction information by using the orderer although the peer can view only some transaction information because of the channel mechanism. Consequently, a channel only exists in name, and information security vulnerability still exists.

SUMMARY

Example embodiments of the present disclosure provide a blockchain generation method and system, and a related device. Only digest information is transmitted between two node devices, and the digest information is a part of content in transaction information. Therefore, an ordering node device does not obtain the complete transaction information, so that information security is improved, and transaction privacy is also protected.

In view of this, a first aspect of embodiments of this application provides a blockchain generation method, and the method includes the following steps:

A client first sends first transaction information to a first node device. The first transaction information includes first basic information and first digest information, the first basic information includes transaction data and a transaction object, the first digest information is fingerprint information (namely, unique information) extracted from the first basic information, and the digest information is usually used to implement functions such as data signature and data integrity check.

Then the client receives a first endorsement result sent by the first node device. The first endorsement result may include a signature generated after the first node device successfully performs transaction simulation. If endorsement fails, no first endorsement result is generated.

The client determines whether the first endorsement result meets a preset transaction condition. If the first endorsement result meets the preset transaction condition, the client sends the first digest information and the first endorsement result to a second node device, so that the second node device sends to the first node device, based on the first endorsement result, the first digest information used to generate a complete blockchain.

It can be learned that in this embodiment of this application, the blockchain generation method is provided. The client first sends the first transaction information to the first node device, where the first transaction information includes the first basic information and the first digest information, and the first transaction information is used to instruct the first node device to perform transaction simulation. The client receives the first endorsement result sent by the first node device, where the first endorsement result includes the signature generated after the first node device successfully performs transaction simulation. If the first endorsement result meets the preset transaction condition, the client sends the first digest information and the first endorsement result to the second node device, so that the second node device sends to the first node device, based on the first endorsement result, the first digest information used to generate a complete blockchain. In the foregoing manner, only the digest information is transmitted between the first node device and the second node device, and the digest information is a part of content in the transaction information. Therefore, the second node device does not obtain the complete transaction information, so that information security is improved, and transaction privacy is also protected.

In a first implementation of the first aspect of the embodiments of this application, the client receives a first endorsement result sent by the first node device may specifically include the following steps:

The client receives N first endorsement results sent by N node devices in the first node device, where N is a positive integer greater than 0. Assuming that there are a total of 100 first node devices, and N is 50, the client receives first endorsement results sent by 50 node devices in the 100 first node devices. Each node device usually sends one endorsement result. After receiving the first endorsement result sent by the first node device, the client determines whether a value of N is greater than or equal to a preset threshold. If N is greater than or equal to the preset threshold, the client determines that the first endorsement result meets the preset transaction condition.

It can be learned that in this embodiment of this application, specific content that meets the preset transaction condition is described. The client needs to receive first endorsement results of a quantity that is greater than or equal to the preset threshold. In other words, it is considered that the preset transaction condition is met only when at least N node devices need to send endorsement results to the client. In the foregoing manner, a plurality of node devices provide endorsement results, so that multi-party verification is implemented, thereby improving endorsement reliability.

In a second implementation of the first aspect of the embodiments of this application, the method may further include the following steps:

The client first sends second transaction information to the first node device. The second transaction information includes second basic information and second digest information, the second basic information includes transaction data and a transaction object, the second digest information is fingerprint information (namely, unique information) extracted from the second basic information, and the digest information is usually used to implement functions such as data signature and data integrity check.

Then the client receives a second endorsement result sent by the first node device. The second endorsement result may include a signature generated after the first node device successfully performs transaction simulation. If endorsement fails, no second endorsement result is generated.

The client determines whether the second endorsement result meets the preset transaction condition. If the second endorsement result meets the preset transaction condition, the client sends the second digest information and the second endorsement result to the second node device, so that the second node device sends, to the first node device based on the second endorsement result, the second digest information used to generate a complete blockchain.

It can be learned that in this embodiment of this application, the client may further conduct a plurality of transactions, a plurality of clients are included for a blockchain, and each client conducts a plurality of different transactions. In the foregoing manner, the client can conduct a plurality of transactions based on a user requirement. In a process of each transaction, only digest information is transmitted between the first node device and the second node device, and the digest information is a part of content in transaction information. Therefore, the second node device does not obtain the complete transaction information, so that information security is improved, and transaction privacy is also protected.

A second aspect of the embodiments of this application provides a blockchain generation method, and the method includes the following steps:

A first node device first receives first transaction information sent by a client. The first transaction information includes first basic information and first digest information, the first basic information includes transaction data and a transaction object, the first digest information is fingerprint information (namely, unique information) extracted from the first basic information, and the digest information is usually used to implement functions such as data signature and data integrity check.

Then the first node device performs transaction simulation based on the first transaction information, to generate a first endorsement result corresponding to the transaction simulation. The first endorsement result includes a signature generated after the first node device successfully performs transaction simulation. If endorsement fails, no first endorsement result is generated.

Then the first node device sends the first endorsement result to the client, so that the client sends the first digest information and the first endorsement result to a second node device. Finally, the first node device receives the first digest information that is sent by the second node device and that is used to generate a complete blockchain.

It can be learned that in this embodiment of this application, the blockchain generation method is provided. The first node device first receives the first transaction information sent by the client, where the first transaction information includes the first basic information and the first digest information, and the first transaction information is used to instruct the first node device to perform transaction simulation. The first node device performs transaction simulation based on the first transaction information, to generate the first endorsement result corresponding to the transaction simulation. Then the first node device sends the first endorsement result to the client. Finally, the first node device receives the first digest information that is sent by the second node device and that is used to generate a complete blockchain. In the foregoing manner, only the digest information is transmitted between the first node device and the second node device, and the digest information is a part of content in the transaction information. Therefore, the second node device does not obtain the complete transaction information, so that information security is improved, and transaction privacy is also protected.

In a first implementation of the second aspect of the embodiments of this application, after the first node device receives the first transaction information sent by the client, the method may further include the following steps:

The first node device first obtains a transaction correspondence based on the first transaction information. The transaction correspondence is used to indicate a correspondence between the first digest information and the first transaction information. Specifically, the transaction correspondence may be a table or a graph relationship. Then the first node device stores the transaction correspondence.

It may be understood that usually, the first node device locally stores the transaction correspondence.

It can be learned that in this embodiment of this application, the first node device may further obtain the transaction correspondence based on the first transaction information, and locally store the transaction correspondence. In the foregoing manner, the first node device can locally store the transaction correspondence, so that corresponding transaction information can be determined based on digest information, thereby improving feasibility and operability of the solution.

In a second implementation of the second aspect of the embodiments of this application, after the first node device receives the first digest information that is sent by the second node device and that is used to generate a complete blockchain, the method may further include the following steps:

Each first node device locally stores the transaction correspondence. Therefore, each first node device may obtain the first transaction information based on the transaction correspondence and the first digest information. The transaction correspondence is used to indicate the correspondence between the first digest information and the first transaction information. Then each first node device generates the complete blockchain based on the first transaction information. The blockchain includes the plurality of blocks, and the blocks are generated by the first node device based on the first transaction information.

It can be learned that in this embodiment of this application, a manner of assembling the blockchain by the first node device is described. To be specific, each first node device obtains the first transaction information based on the transaction correspondence and the first digest information, and may generate the complete blockchain by using the first transaction information. In the foregoing manner, each first node device may assemble the blockchain, and the first node devices do not need to notify each other of the blockchain, so that practicability of the solution is improved.

In a third implementation of the second aspect of the embodiments of this application, after the first node device receives the first digest information that is sent by the second node device and that is used to generate a complete blockchain, the method may further include the following steps:

The first node device first obtains the first transaction information based on the transaction correspondence and the first digest information. The transaction correspondence is used to indicate the correspondence between the first digest information and the first transaction information. Then the first node device generates a complete blockchain based on the first transaction information, and the first node device broadcasts the complete blockchain to another first node device.

It can be learned that in this embodiment of this application, another manner of assembling the blockchain by the first node device is described. To be specific, one first node device generates the complete blockchain based on the first transaction information, and then the first node device broadcasts the complete blockchain to another first node device. In the foregoing manner, only one first node device needs to assemble the complete blockchain, so that flexibility and feasibility of the solution are improved.

In fourth implementation of the second aspect of the embodiments of this application, after the first node device receives the first transaction information sent by the client, the method may further include the following steps:

The first node device first receives second transaction information sent by the client. The second transaction information includes second basic information and second digest information, the second basic information includes transaction data and a transaction object, the second digest information is fingerprint information (namely, unique information) extracted from the second basic information, and the digest information is usually used to implement functions such as data signature and data integrity check.

Then the first node device performs transaction simulation based on the second transaction information, to generate a second endorsement result corresponding to the transaction simulation. The second endorsement result includes a signature generated after the first node device successfully performs transaction simulation. If endorsement fails, no second endorsement result is generated.

Then the first node device sends the second endorsement result to the client, so that the client sends the second digest information and the second endorsement result to the second node device. Finally, the first node device receives the second digest information that is sent by the second node device and that is used to generate a complete blockchain.

It can be learned that in this embodiment of this application, the first node device may further conduct a plurality of transactions, a plurality of clients are included for a blockchain, and each client conducts a plurality of different transactions. In the foregoing manner, the client can conduct a plurality of transactions based on a user requirement. In a process of each transaction, only digest information is transmitted between the first node device and the second node device, and the digest information is a part of content in transaction information. Therefore, the second node device does not obtain the complete transaction information, so that information security is improved, and transaction privacy is also protected.

A third aspect of the embodiments of this application provides a blockchain generation method, and the method includes the following steps:

A second node device first receives first digest information and a first endorsement result that are sent by a client. The first endorsement result is a signature generated after a first node device successfully performs transaction simulation, the first digest information belongs to first transaction information, the first transaction information further includes first basic information, and the first basic information includes transaction data and a transaction object. Then the second node device may send the first digest information to the first node device based on the first endorsement result, so that the first node device generates a complete blockchain based on the first digest information.

It can be learned that in this embodiment of this application, the second node device first receives the first digest information and the first endorsement result that are sent by the client, where the first endorsement result is the signature generated after the first node device successfully performs transaction simulation. The second node device sends the first digest information to the first node device based on the first endorsement result, so that the first node device generates the complete blockchain based on the first digest information. In the foregoing manner, only the digest information is transmitted between the first node device and the second node device, and the digest information is a part of content in the transaction information. Therefore, the second node device does not obtain the complete transaction information, so that information security is improved, and transaction privacy is also protected.

In a first implementation of the third aspect of the embodiments of this application, that the second node device sends the first digest information to the first node device based on the first endorsement result specifically includes the following step:

After the second node device determines, based on the first endorsement result, that a current transaction is a valid transaction, the second node device sends the first digest information to the first node device.

It can be learned that in this embodiment of this application, the second node device needs to first determine whether the current transaction is a valid transaction, and if the current transaction is a valid transaction, the second node device may send the first digest information to the first node device. In the foregoing manner, reliability of the solution can be improved, and a transaction is conducted on the premise that the transaction is valid, so that practicality of the solution is improved.

In a second implementation of the third aspect of the embodiments of this application, after the second node device receives the first digest information and the first endorsement result that are sent by the client, the method may further include the following steps:

If a second endorsement result meets a preset transaction condition, the second node device receives second digest information and the second endorsement result that are sent by the client. The second endorsement result is a signature generated after the first node device successfully performs transaction simulation. Then the second node device may determine a transaction sequence based on the first digest information and the second digest information. Determining the transaction sequence may be specifically referred to as "ordering". Ordering is performed according to a first come first ordered rule. Then the second node device sends the second digest information to the first node device based on an ordering result and the second endorsement result, so that the first node device generates a complete blockchain based on the second digest information.

It can be learned that in this embodiment of this application, the second node device determines the transaction sequence based on the first digest information and the second digest information. In an actual application, the transaction sequence may be determined based on a plurality of pieces of digest information. In the foregoing manner, the first node device generates a corresponding blockchain based on a specific transaction sequence, so that feasibility of the solution is improved.

A fourth aspect of the embodiments of this application provides a blockchain generation method, and the method may include the following steps:

A client first sends transaction information to a first node device. The transaction information includes transaction data and a transaction object. Then the client receives an endorsement result sent by the first node device. The endorsement result is a signature generated after the first node device successfully performs transaction simulation. The transaction simulation means simulating a user transaction process according to a rule of a smart contract, to predict whether a transaction succeeds. If the transaction succeeds, the first node device signs the transaction and generates an endorsement result.

If the endorsement result meets a preset transaction condition, the client sends the transaction information and the endorsement result to second node devices, so that the second node devices generate a complete blockchain based on the transaction information and the endorsement result. The second node devices belong to a same transaction group.

In this embodiment of this application, transaction information is not received by all second node devices, and therefore the transaction information is not leaked to a transaction-unrelated second node device, and transaction privacy is not leaked. In this application, second node devices are grouped, so that only a second node device group related to a current transaction is selected to provide an ordering service when the transaction is sent. Therefore, a transaction-unrelated participant is fundamentally prevented from obtaining any transaction information, so that transaction privacy is protected.

In first implementation of the fourth aspect of the embodiments of this application, before the client sends the transaction information and the endorsement result to the second node devices, the method may further include the following steps:

The client first obtains a group identifier from configuration information based on the transaction information. The group identifier is used to indicate second node devices belonging to a same transaction group, and the configuration information is a preset correspondence between transaction information and a group identifier. The client may determine, based on the group identifier, the second node devices belonging to a same transaction group.

It can be learned that in this embodiment of this application, the client may determine, by using a group identifier in configuration information, second node devices of a group to which a current transaction needs to be sent, and a second node device unrelated to the current transaction does not receive related transaction information. In the foregoing manner, transaction privacy can be protected. In addition, second node devices belonging to a same group are determined by using predefined configuration information, so that reliability of the solution can be improved.

In a second implementation of the fourth aspect of the embodiments of this application, before the client sends the transaction information and the endorsement result to the second node devices, the method may further include the following steps:

The client first obtains a target channel identifier corresponding to the transaction information. The target channel identifier is used to indicate the first node device that has a communication connection relationship with the client, and a channel corresponding to the target channel identifier is used for data exchange between the client and the first node device. Generally, the client may establish a communication connection to a plurality of first node devices. Then the client may determine, based on a group correspondence, a same transaction group corresponding to the target channel identifier. The group correspondence is a correspondence between a channel identifier and a transaction group. Finally, the client obtains second node devices belonging to the same transaction group, and sends the transaction information to the second node devices belonging to the same transaction group.

It can be learned that in this embodiment of this application, the client may obtain the target channel identifier corresponding to the transaction information, and determine, based on the group correspondence, the same transaction group corresponding to the target channel identifier, and therefore obtain the second node devices belonging to the same transaction group. In the foregoing manner, second node devices of a transaction group to which a current transaction needs to be sent can be determined, and a second node device other than the transaction group does not receive related transaction information. In the foregoing manner, transaction privacy can be protected, and flexibility and reliability of the solution are also improved.

In a third implementation of the fourth aspect of the embodiments of this application, the method may further include the following step:

If the client detects that the second node devices do not belong to a same transaction group, the client generates a prompt message. The prompt message is used to indicate that an error occurs in a transaction. A prompt may be provided through voice, or prompt content may be displayed on the client, so that a user can obtain a transaction status in a timely manner.

It can be learned that in this embodiment of this application, if the client detects that the second node devices do not belong to a same transaction group, the client generates the prompt message indicating that an error occurs in the current transaction. In the foregoing manner, the transaction information can be prevented from being sent to second node devices that do not belong to a same transaction group, so that reliability of the solution is improved. In addition, the user can be notified of a transaction error in a timely manner, so that error diagnosis and rectification can be performed in a timely manner.

A fifth aspect of the embodiments of this application provides a client, and the client includes:

a sending module, configured to send first transaction information to a first node device, where the first transaction information includes first basic information and first digest information, the first transaction information is used to instruct the first node device to perform transaction simulation, and the first basic information includes transaction data and a transaction object and a receiving module, configured to receive a first endorsement result sent by the first node device, where the first endorsement result includes a signature generated after the first node device successfully performs transaction simulation, where the sending module is configured to: if the first endorsement result received by the receiving module meets a preset transaction condition, send the first digest information and the first endorsement result to a second node device, so that the second node device sends to the first node device, based on the first endorsement result, the first digest information used to generate a complete blockchain.

In a first implementation of the fifth aspect of the embodiments of this application, the client further includes a determining module, where the receiving module is further configured to receive N first endorsement results sent by N node devices in the first node device, where N is a positive integer greater than 0; and the determining module is configured to: after the receiving module receives the first endorsement result sent by the first node device, if N is greater than or equal to a preset threshold, determine that the first endorsement result meets the preset transaction condition.

In a second implementation of the fifth aspect of the embodiments of this application, the sending module is further configured to send second transaction information to the first node device, where the second transaction information includes second basic information and second digest information, and the second transaction information is used to instruct the first node device to perform transaction simulation;

the receiving module is further configured to receive a second endorsement result sent by the first node device, where the second endorsement result is a signature generated after the first node device successfully performs transaction simulation; and the sending module is further configured to: if the second endorsement result received by the receiving module meets the preset transaction condition, send the second digest information and the second endorsement result to the second node device, so that the second node device sends, to the first node device based on the second endorsement result, the second digest information used to generate a complete blockchain, and determines, based on the first digest information and the second digest information, a transaction sequence corresponding to a plurality of transactions.

A sixth aspect of the embodiments of this application provides a node device, and the node device includes:

a receiving module, configured to receive first transaction information sent by a client, where the first transaction information includes first basic information and first digest information, and the first basic information includes transaction data and a transaction object;

a generation module, configured to perform transaction simulation based on the first transaction information received by the receiving module, to generate a first endorsement result corresponding to the transaction simulation, where the first endorsement result includes a signature generated after the first node device successfully performs transaction simulation; and a sending module, configured to send the first endorsement result generated by the generation module to the client, so that the client sends the first digest information and the first endorsement result to a second node device, where the receiving module is configured to receive the first digest information that is sent by the second node device and that is used to generate a complete blockchain.

In a first implementation of the sixth aspect of the embodiments of this application, the node device further includes an obtaining module and a storage module, where the obtaining module is configured to: after the receiving module receives the first transaction information sent by the client, obtain a transaction correspondence based on the first transaction information, where the transaction correspondence is used to indicate a correspondence between the first digest information and the first transaction information; and the storage module is configured to store the transaction correspondence obtained by the obtaining module.

In a second implementation of the sixth aspect of the embodiments of this application, the obtaining module is further configured to: after the receiving module receives the first digest information that is sent by the second node device and that is used to generate a complete blockchain, obtain the first transaction information based on the transaction correspondence and the first digest information, where the transaction correspondence is used to indicate the correspondence between the first digest information and the first transaction information; and the generation module is further configured to generate a complete blockchain based on the first transaction information obtained by the obtaining module, where the blockchain includes a plurality of blocks, and the blocks are generated by the first node device based on the first transaction information.

In a third implementation of the sixth aspect of the embodiments of this application, the obtaining module is further configured to: after the receiving module receives the first digest information that is sent by the second node device and that is used to generate a complete blockchain, obtain the first transaction information based on the transaction correspondence and the first digest information, where the transaction correspondence is used to indicate the correspondence between the first digest information and the first transaction information;

the generation module is further configured to generate a complete blockchain based on the first transaction information obtained by the obtaining module; and the sending module is further configured to broadcast the complete blockchain generated by the generation module to another first node device that has a same node device function as the first node device.

In a fourth implementation of the sixth aspect of the embodiments of this application, the receiving module is further configured to: after receiving the first transaction information sent by the client, receive second transaction information sent by the client, where the second transaction information includes second basic information and second digest information;

the generation module is further configured to perform transaction simulation based on the second transaction information received by the receiving module, to generate a second endorsement result corresponding to the transaction simulation, where the second endorsement result is a signature generated after the first node device successfully performs transaction simulation;

the sending module is further configured to send the second endorsement result generated by the generation module to the client, so that the client sends the second digest information and the second endorsement result to the second node device if the second endorsement result meets a preset transaction condition; and the receiving module is further configured to receive the second digest information sent by the second node device based on the second endorsement result, so that the second node device determines a transaction sequence based on the first digest information and the second digest information.

A seventh aspect of the embodiments of this application provides a node device, and the node device includes:

a receiving module, configured to receive first digest information and a first endorsement result that are sent by a client, where the first endorsement result is a signature generated after a first node device successfully performs transaction simulation, the first digest information belongs to first transaction information, the first transaction information further includes first basic information, and the first basic information includes transaction data and a transaction object; and a sending module, configured to send the first digest information to the first node device based on the first endorsement result received by the receiving module, so that the first node device generates a complete blockchain based on the first digest information.

In a first implementation of the seventh aspect of the embodiments of this application, the sending module is further configured to: after the second node device determines, based on the first endorsement result, that a current transaction is a valid transaction, send the first digest information to the first node device.

In a second implementation of the seventh aspect of the embodiments of this application, the node device further includes a determining module, where the receiving module is further configured to: after receiving the first digest information and the first endorsement result that are sent by the client, if a second endorsement result meets a preset transaction condition, receive second digest information and the second endorsement result that are sent by the client, where the second endorsement result is a signature generated after the first node device successfully performs transaction simulation;

the determining module is configured to determine a transaction sequence based on the first digest information and the second digest information that is received by the receiving module; and the sending module is further configured to send the second digest information to the first node device based on the transaction sequence determined by the determining module and the second endorsement result, so that the first node device generates a complete blockchain based on the second digest information.

An eighth aspect of the embodiments of this application provides a client, and the client includes:

a sending module, configured to send transaction information to a first node device; and a receiving module, configured to receive an endorsement result sent by the first node device, where the endorsement result is a signature generated after the first node device successfully performs transaction simulation, where the sending module is configured to: if the endorsement result meets a preset transaction condition, send the transaction information and the endorsement result that is received by the receiving module to second node devices, so that the second node devices generate a complete blockchain based on the transaction information and the endorsement result, where the second node devices belong to a same transaction group.

In a first implementation of the eighth aspect of the embodiments of this application, the client further includes an obtaining module and a determining module, where the obtaining module is configured to: before the sending module sends the transaction information and the endorsement result to the second node devices, obtain a group identifier from configuration information based on the transaction information, where the group identifier is used to indicate second node devices belonging to a same transaction group, and the configuration information is a preset correspondence between transaction information and a group identifier; and the determining module is configured to determine, based on the group identifier obtained by the obtaining module, the second node devices belonging to a same transaction group.

In a second implementation of the eighth aspect of the embodiments of this application, the client further includes an obtaining module and a determining module, where the obtaining module is configured to: before the sending module sends the transaction information and the endorsement result to the second node devices, obtain a target channel identifier corresponding to the transaction information, where the target channel identifier is used to indicate the first node device that has a communication connection relationship with the client, and a channel corresponding to the target channel identifier is used for data exchange between the client and the first node device;

the determining module is configured to determine, based on a group correspondence, a same transaction group corresponding to the target channel identifier obtained by the obtaining module, where the group correspondence is a correspondence between a channel identifier and a transaction group; and the obtaining module is configured to obtain second node devices belonging to the same transaction group determined by the determining module.

In a third implementation of the eighth aspect of the embodiments of this application, the client further includes a generation module, where the generation module is configured to: if the second node devices do not belong to a same transaction group, generate a prompt message, where the prompt message is used to indicate that an error occurs in a transaction.

A ninth aspect of the embodiments of this application provides a client, and the client includes a memory, a transceiver, a processor, and a bus system, where the memory is configured to store a program and an instruction;

the transceiver is configured to receive or send information under the control of the processor;

the processor is configured to execute the program in the memory;

the bus system is configured to connect the memory, the transceiver, and the processor, so that the memory, the transceiver, and the processor communicate with each other; and the processor is configured to invoke the program and instruction in the memory to perform the method described in the first aspect or the fourth aspect.

A tenth aspect of the embodiments of this application provides a node device, and the node device includes a memory, a transceiver, a processor, and a bus system, where the memory is configured to store a program and an instruction;

the transceiver is configured to receive or send information under the control of the processor;

the processor is configured to execute the program in the memory;

the bus system is configured to connect the memory, the transceiver, and the processor, so that the memory, the transceiver, and the processor communicate with each other; and the processor is configured to invoke the program and instruction in the memory to perform the method described in the second aspect.

An eleventh aspect of the embodiments of this application provides a node device, and the node device includes a memory, a transceiver, a processor, and a bus system, where the memory is configured to store a program and instructions;

the transceiver is configured to receive or send information under the control of the processor;

the processor is configured to execute the program in the memory;

the bus system is configured to connect the memory, the transceiver, and the processor, so that the memory, the transceiver, and the processor communicate with each other; and the processor is configured to invoke the program and instructions in the memory to perform the method according to the third aspect.

A twelfth aspect of the embodiments of this application provides a blockchain generation system, and the blockchain generation system includes a client, a first node device, and a second node device, where the client sends first transaction information to the first node device, where the first transaction information includes first basic information and first digest information, and the first basic information includes transaction data and a transaction object;

the first node device performs transaction simulation based on the first transaction information;

the first node device sends a first endorsement result to the client, where the first endorsement result includes a signature generated after the first node device successfully performs transaction simulation;

if the first endorsement result meets a preset transaction condition, the client sends the first digest information and the first endorsement result to the second node device; and the second node device sends to the first node device, based on the first endorsement result, the first digest information used to generate a complete blockchain.

A thirteenth aspect of the embodiments of this application provides a computer-readable storage medium, where the computer-readable storage medium stores an instruction, and when the instruction runs on a computer, the computer performs the method according to the foregoing aspects.

A fourteenth aspect of the embodiments of this application provides a computer program product including an instruction, where when the computer program product runs on a computer, the computer can perform the method according to any one of the foregoing aspects.

In addition, for technical effects brought by any design manner of the fifth aspect to the fourteenth aspect, refer to technical effects brought by different design manners of the first aspect to the fourth aspect. Details are not described herein again.

It can be learned from the foregoing technical solutions that example embodiments of this application have at least the following advantages:

In the embodiments of this application, the blockchain generation method is provided. The client first sends the first transaction information to the first node device, where the first transaction information includes the first basic information and the first digest information, and the first transaction information is used to instruct the first node device to perform transaction simulation. The client receives the first endorsement result sent by the first node device, where the first endorsement result includes the signature generated after the first node device successfully performs transaction simulation. If the first endorsement result meets the preset transaction condition, the client sends the first digest information and the first endorsement result to the second node device, so that the second node device sends to the first node device, based on the first endorsement result, the first digest information used to generate a complete blockchain. In the foregoing manner, only the digest information is transmitted between the first node device and the second node device, and the digest information is a part of content in the transaction information. Therefore, the second node device does not obtain the complete transaction information, so that information security is improved, and transaction privacy is also protected.

DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure.

FIG. 7($b$) is another schematic diagram of conducting a transaction based on digest information according to an embodiment of this application;

FIG. 7($c$) is another schematic diagram of conducting a transaction based on digest information according to an embodiment of this application;

FIG. 7($d$) is another schematic diagram of conducting a transaction based on digest information according to an embodiment of this application;

DESCRIPTION OF EMBODIMENTS

Example embodiments of the present disclosure provide a blockchain generation method and system, and a related device. Only digest information is transmitted between two node devices, and the digest information is a part of content in transaction information. Therefore, an ordering node device does not obtain the complete transaction information, so that information security is improved, and transaction privacy is also protected.

In the present disclosure, claims, and accompanying drawings of this application, the terms "first", "second", "third", "fourth", and so on (if existent) are intended to distinguish between similar objects but do not necessarily indicate a specific order. It should be understood that the data termed in such a way is interchangeable in proper circumstances so that the embodiments of this application described herein can be implemented in an order other than the order illustrated or described herein. Moreover, the terms "include", "contain", and any other variants mean to cover the non-exclusive inclusion. For example, a process, method, system, product, or device that includes a list of steps or units is not necessarily limited to those steps or units expressly listed, but may include other steps or units not expressly listed or inherent to such a process, method, product, or device.

It should be understood that this application is mainly applied to a blockchain system. A blockchain is a chain data structure in which data blocks are sequentially connected, and is a distributed ledger that is untamperable and unforgeable because of cryptography. A blockchain technology is essentially a distributed database technology in which constantly increasing tamper-resistant data records that can be shared can be maintained. For ease of description, the following describes advantages of the blockchain system by comparing a conventional payment system and a blockchain payment system.

Figure 1:
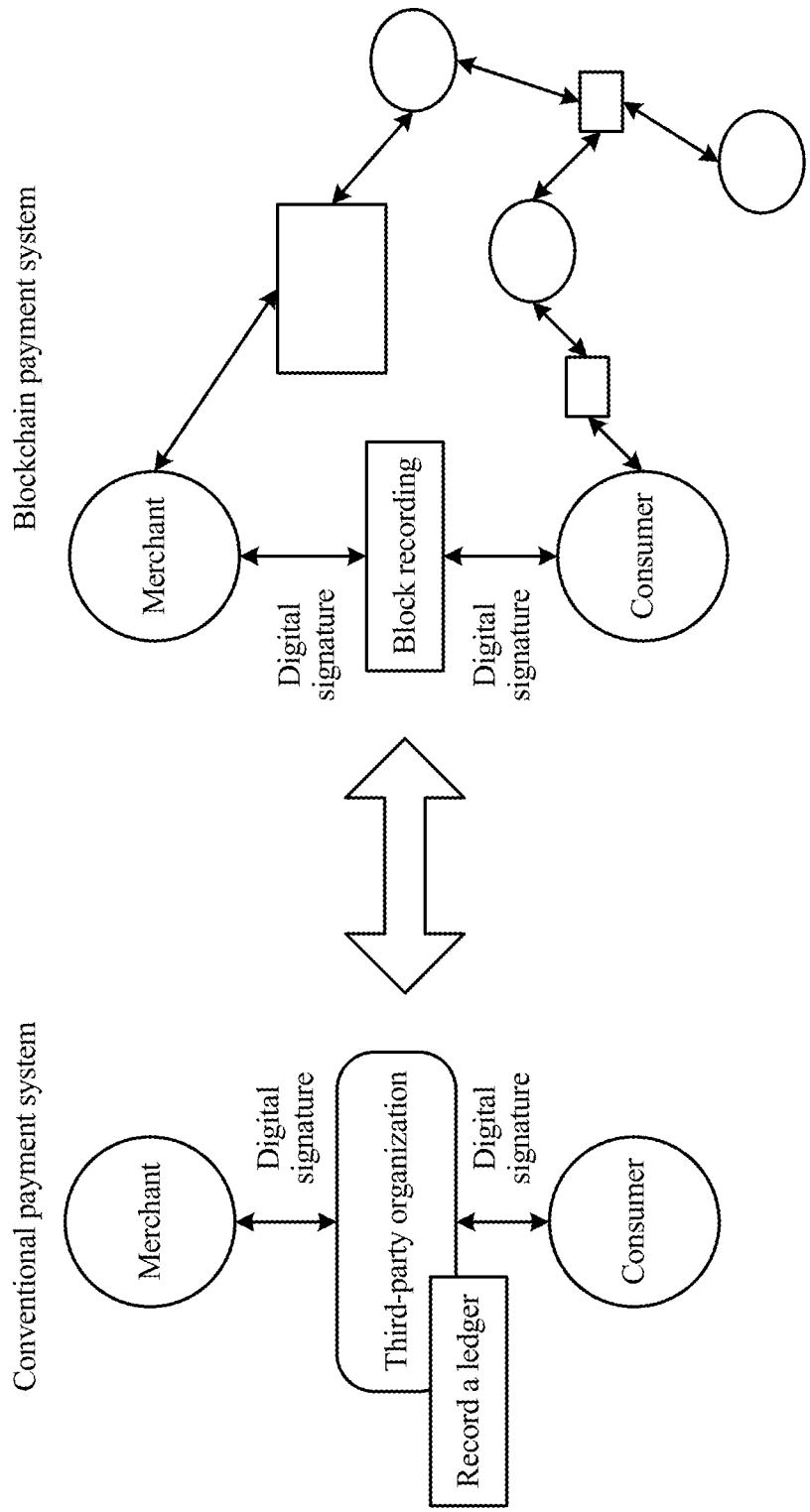
FIG. 1 is a schematic diagram of comparison between a conventional payment system and a blockchain payment system according to an embodiment of this application.

FIG. 1 is a schematic diagram of comparison between a conventional payment system and a blockchain payment system according to an embodiment of this application. As shown in the figure, in the conventional payment system, a third-party organization performs authentication on a transaction between a merchant and a consumer. The third-party organization may be a bank, a credit company, or the like. The third-party organization performs authentication on the transaction between the merchant and the consumer by recording a ledger. However, in blockchain payment, a transaction between a merchant and a consumer is recorded by using a plurality of blocks, and therefore the transaction needs to be approved by a plurality of parties. By comparison, the conventional payment system has the following disadvantages.

First, in the conventional payment system, a mode of processing information with the help of a third-party organization has an endogenous weakness, that is, lack of trust between points. To keep a watch out for a consumer of a merchant, the merchant demands totally unnecessary information from the customer, but still cannot avoid fraudulent behavior. Second, in the conventional payment system, due to the existence of an intermediary organization, transaction costs are increased, and an actually feasible minimum transaction size is limited. In addition, a digital signature can be used to resolve a problem about an electronic money identity, and the digital signature will lose its value if double spending can be avoided only with the support of a third party.

Figure 2:
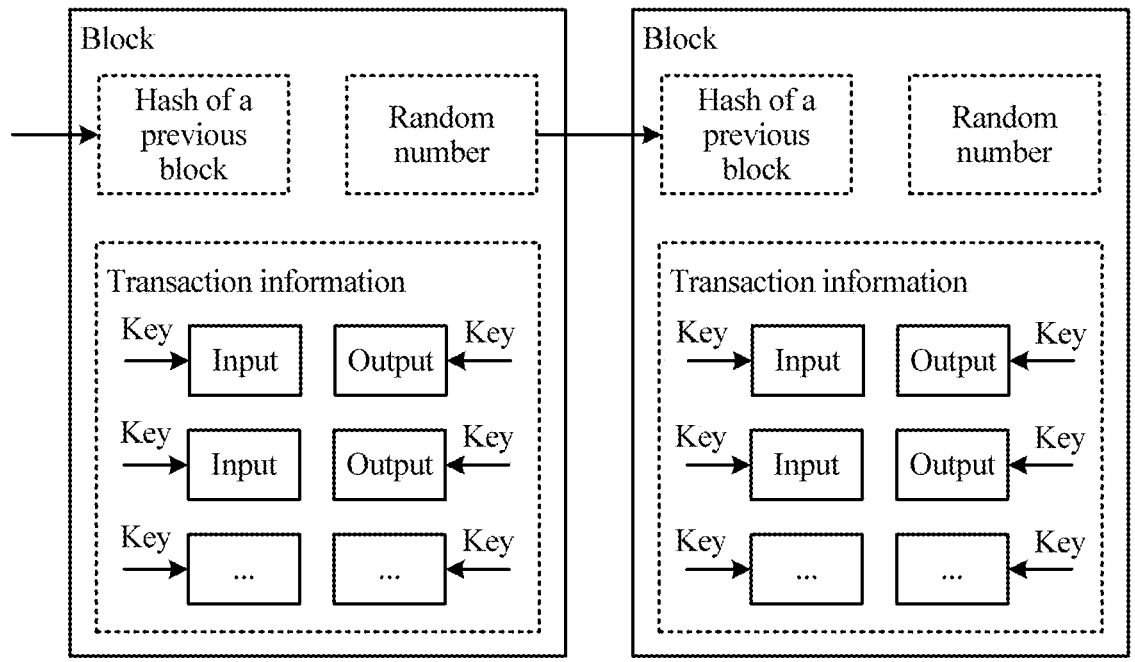
FIG. 2 is a schematic diagram of composition of a blockchain according to an embodiment of this application.

The core of a blockchain technology is that all currently participating nodes maintain a transaction and a database together. In the blockchain technology, the transaction is based on a cryptography principle instead of trust, so that any two parties that reach an agreement can directly conduct a payment transaction without participation of a third party. Technically, a block is a data structure used to record a transaction and reflects capital flow of the transaction. Blocks of transactions that have been completed in a system are connected together to form a main chain, and all nodes participating in calculation record the main chain or a part of the main chain. A bitcoin is used as an example. FIG. 2 is a schematic diagram of composition of a blockchain according to an embodiment of this application. As shown in the figure, a block includes the following three parts: transaction information, a hash of a previous block, and a random number. The transaction information is task data carried by the block, and specifically includes private keys of both transaction parties, a quantity of transactions, a digital signature of electronic money, and the like. The hash of the previous block is used to connect blocks to implement sequential arrangement of historical transactions. The random number is the core of a transaction. All mining nodes calculate an answer to the random number through contention. A node that obtains the answer most quickly generates a new block and broadcasts the new block to all nodes for update. In this way, a transaction is completed.

The bitcoin supports only a simple digital currency settlement script. On this basis, blockchain projects that support a turing complete script, for example, ethereum and hyperledger, are sequentially developed, a more flexible contract function can be provided in addition to a currency transaction function, and a more complex operation can be performed. The script is also referred to as a smart contract.

Figure 3:
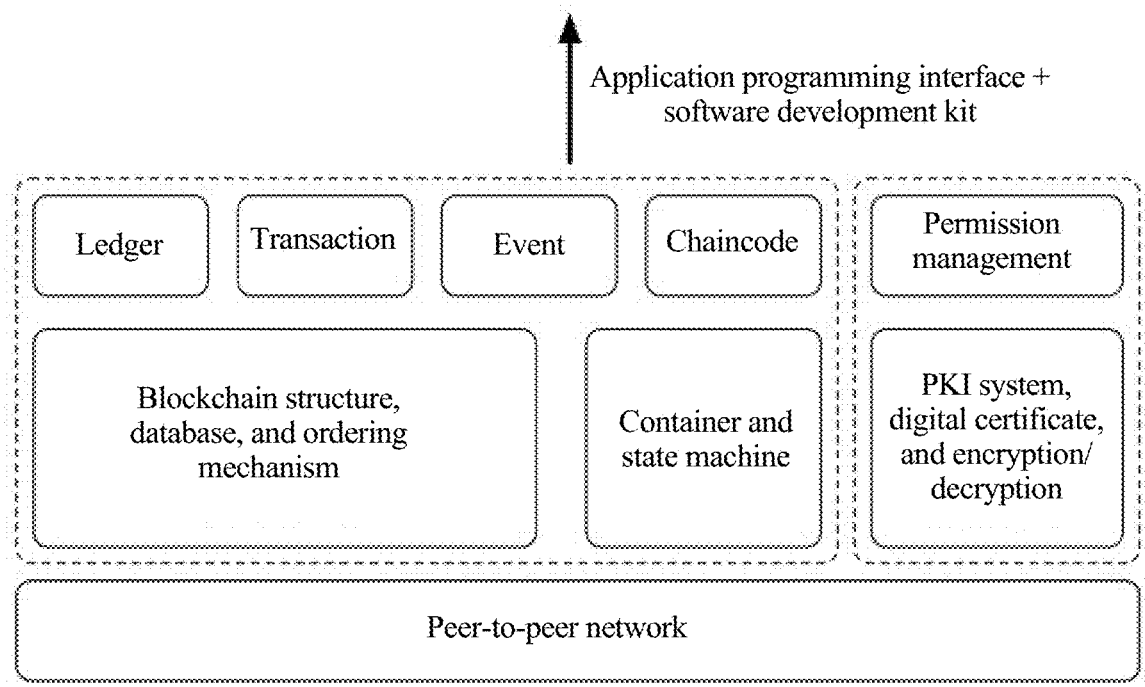
FIG. 3 is a schematic architectural diagram of hyperledger fabric according to an embodiment of this application.

It should be understood that embodiments of this application may be applied to hyperledger fabric. The hyperledger project is the first important exploration of making a blockchain technology available to an enterprise, and the fabric is the most important subproject in the hyperledger project. For ease of understanding, refer to FIG. 3. FIG. 3 is a schematic architectural diagram of hyperledger fabric according to an embodiment of this application. As shown in the figure, the fabric provides a google remote procedure call (gRPC) application programming interface (API) for an application, and provides, for the application to call, a software development kit (SDK) for encapsulating the API. The application may access a plurality of resources in a fabric network by using the SDK, and the plurality of resources include a ledger, a transaction, chaincode, an event, and permission management. The ledger is a core structure and records application information. The application records data in the ledger by initiating a transaction. Execution logic of the transaction is carried by the chaincode. Events that occur during running of the entire network may be accessed by the application to trigger an external procedure or even another system. The permission management is responsible for access control in an entire process. The ledger and the transaction further depend on technologies such as the core blockchain structure, a database, and an ordering mechanism. The chaincode depends on technologies such as a container and a state machine. Many existing security technologies such as a public key infrastructure (PKI) system, a digital certificate, and an encryption/decryption algorithm are used for the permission management. At an underlying layer, a peer-to-peer (P2P) network includes a plurality of nodes, and the plurality of nodes interact with each other through a gRPC channel, and are synchronized with each other by using a gossip protocol.

Figure 4:
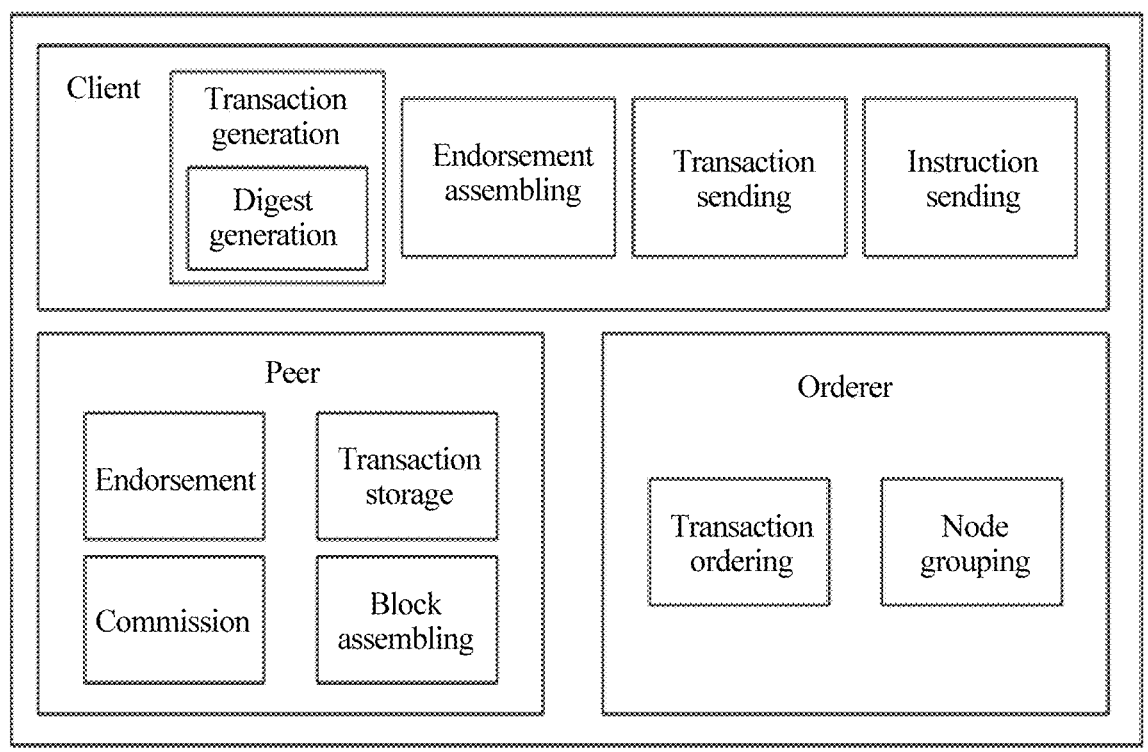
FIG. 4 is a schematic architectural diagram of a blockchain generation system according to an embodiment of this application.

It should be understood that this application may be specifically applied to a blockchain generation system. FIG. 4 is a schematic architectural diagram of a blockchain generation system according to an embodiment of this application. As shown in the figure, the blockchain generation system mainly includes a client, a peer, and an orderer.

The client is mainly configured to send a transaction or send an instruction. The peer is mainly configured to endorse the transaction sent by the client, and finally determine a block and change a world state of the peer. The orderer is mainly used for an ordering service of ordering information packaged by the client.

More specifically, as an end user, the client needs to be connected to the peer to communicate with a blockchain, and the client may be connected to any peer. The client creates and invokes a transaction, and communicates with both the peer and the orderer. The peer receives ordered transactions to update a status, in other words, maintain the status and a ledger. The peer may be an endorser or a committer. A function of the endorser is related to specific chaincode, and the endorser is configured to endorse a transaction before commission. The orderer is configured to ensure a delivery process. The ordering service is used to provide a shared communication channel to the client and the peer. A transaction message broadcast service is provided, so that messages can be broadcast on the channel after clients are connected to the channel. These messages are broadcast to all peers. It should be noted that one ordering service may support a plurality of channels, and one client may also be connected to a plurality of channels.

In a transaction procedure, the client sends a transaction request to the endorser (there may be one or more endorsers according to an endorsement policy). The endorser performs verification on a signature of the client, executes chaincode and simulates a transaction, and then sends a chaincode execution result and an endorsement signature to the client. The client collects sufficient endorsement information, packages the endorsement information into transactions, and then broadcasts the transactions to the orderer. The orderer performs ordering based on the ordering service, and distributes transactions to all peers on a channel in a form of blocks.

For ease of description, the following first describes keywords in the present disclosure.

Client an application. Fabric provides a plurality of SDK implementations, and a user may create chaincode, initiate a transaction, and so on by using the client.

Chaincode: a smart contract. The chaincode is specifically a segment of code logic that runs in a container. All transactions initiated by the user need to be processed by using the chaincode.

Endorser: After the user initiates a transaction, the endorser simulates execution of the chaincode, verifies validity of the transaction, determines whether to sign the transaction, and returns a result.

Committer: The committer obtains a blockchain generated by an orderer, verifies validity of a transaction, and writes a result of conducting the transaction in the chaincode into a ledger.

Peer: The peer may be an endorser or a committer. The peer locally stores a blockchain and a world state, and also manages a container in which the chaincode runs.

World state: the latest global ledger status. Fabric uses the world state to store the latest status generated after a historical transaction occurs. This may be implemented by using a key and a value or a document database.

Ledger: The ledger includes a blockchain structure (including all transaction information) and a current world state.

Channel: a private isolation mechanism in a fabric network. Chaincode and a transaction on the channel are visible only to a peer that joins the channel. A same peer may join a plurality of channels, and maintains a ledger for each channel. A transaction of one channel is invisible to another channel, so that a transaction is visible only to a related peer, and privacy is protected.

Orderer: The orderer orders transactions, generates a blockchain, and ensures a sequence of the transactions in the blockchain.

Node: a communications entity in a blockchain. One node refers to one logical function, and therefore different types of nodes can run on a physical host.

The following describes an example blockchain generation method with reference to accompanying drawings. The blockchain generation method provided in the present disclosure may include the following two embodiments. Details are as follows:

In Embodiment 1, a complete blockchain is generated by using an information segmentation method.

Figure 5:
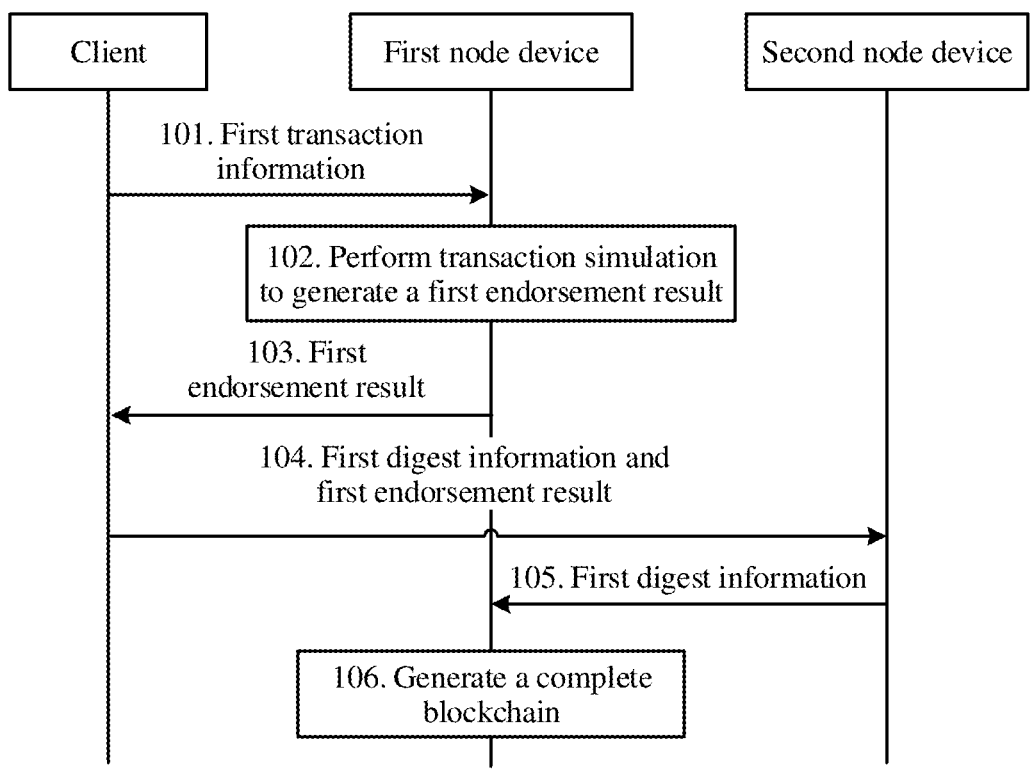
FIG. 5 is a schematic diagram of an example blockchain generation method according to an embodiment of this application.

FIG. 5 is a schematic diagram of an example blockchain generation method according to an embodiment of this application. The example blockchain generation method includes the following steps.

101. A client sends first transaction information to a first node device, and the first node device receives the first transaction information sent by the client, where the first transaction information includes first basic information and first digest information, and the first basic information includes transaction data and a transaction object.

In this embodiment, the first node device may be a peer, and a second node device may be an orderer. The client first sends the first transaction information to the peer. The first transaction information includes the first basic information and the first digest information. The first basic information includes the transaction data and the transaction object. For example, if a user X initiates a transfer request to a user Y by using a client A, and a transfer amount is 100, transaction objects are "user X" and "user Y", and transaction data is "100". The first digest information is fingerprint information (namely, unique information) extracted from the first basic information. The digest information is usually used to implement functions such as data signature and data integrity check, and is obtained by using a data digest algorithm. The data digest algorithm is also referred to as a hash algorithm.

In the hash algorithm, a binary value of any length is mapped to a relatively small binary value of a fixed length, and the small binary value is referred to as a hash value. The hash value is a unique and very compact value denotation form of a segment of data. If a segment of plain text is hashed and even if only one letter of the segment is changed, a subsequent hash has different values. It is basically impossible to find, through calculation, two different inputs that are hashed into a same value. A message authentication code (MAC) hash function is usually used with digital signature to sign data, and a message detection code hash function is used for data integrity.

After receiving the first transaction information sent by the client, the peer serving as the first node device may further obtain a transaction correspondence based on the first transaction information. The peer needs to locally store the transaction correspondence by using a transaction storage module, and the transaction correspondence is used to indicate a correspondence between the first digest information and the first transaction information. Table 1 shows the transaction correspondence locally stored by the peer.

TABLE 1

| Number | Digest information | Transaction information |
|---|---|---|
| 1 | 10110101 | A user A transfers 100 to a user B at 13:25:10. 10110101 |
| 2 | 11001010 | The user A transfers 50 to a user C at 11:40:00. 11001010 |
| 3 | 00101011 | The user C transfers 20 to the user B at 5:42:17. 00101011 |
| 4 | 11000001 | A user D transfers 10 to the user A at 18:56:23. 11000001 |
| 5 | 00100100 | The user C transfers 10 to the user A at 14:05:15. 00100100 |

It may be understood that in actual application, the transaction correspondence locally stored by the peer may further include other information, and the foregoing content is merely an example. The digest information and the transaction information may be considered as "key" and "value", namely, "key-value pair". A key-value distributed storage system has a high query speed, can store a large amount of data, and supports high concurrency, and therefore it is very suitable to perform a query by using a primary key. If the key-value distributed storage system performs complex condition retrieval and full text retrieval with assistance of a real-time search engine (RTSE), the key-value distributed storage system can replace a relational database with low concurrency performance, so that high concurrency and high performance are achieved, and a quantity of servers is reduced by dozens of times.

102. The first node device performs transaction simulation based on the first transaction information, to generate a first endorsement result corresponding to the transaction simulation, where the first endorsement result includes a signature generated after the first node device successfully performs transaction simulation.

In this embodiment, the peer performs transaction simulation based on the received first transaction information. Specifically, an endorser in the peer may perform transaction simulation. The transaction simulation means simulating, according to a rule of a smart contract, a process in which a user A makes a transfer to a user B, to predict whether the transfer succeeds. If the transfer succeeds, the endorser signs the transaction and generates a first endorsement result.

103. The first node device sends the first endorsement result to the client, and the client receives the first endorsement result sent by the first node device.

In this embodiment, the peer sends the generated first endorsement result to the client, and the client receives the first endorsement result sent by the peer. For a blockchain, a plurality of clients, peers, and orderers are included, and the client needs to collect sufficient first endorsement results to meet a preset transaction condition.

Specifically, it is assumed that there are a total of M peers, and when first endorsement results sent by N peers are received, it is considered that the preset transaction condition is met, where N is greater than 0 and less than or equal to M. Generally, N is a positive integer greater than or equal to 2.

104. If the first endorsement result meets a preset transaction condition, the client sends the first digest information and the first endorsement result to a second node device, and the second node device receives the first digest information and the first endorsement result that are sent by the client.

In this embodiment, if the first endorsement result meets the preset transaction condition, the client packages the first digest information and the first endorsement result. It should be noted that in this case, the client does not package the complete first transaction information, but packages only the first digest information in the first transaction information, and then sends the first digest information to an orderer corresponding to a channel. The orderer performs ordering. The ordering means recording a transaction sequence. For example, five clients sequentially send transaction requests to the peer, and the orderer sequentially records transaction information sent by the five clients.

105. The second node device sends the first digest information to the first node device based on the first endorsement result.

In this embodiment, the orderer determines, based on the first endorsement result, that a current transaction is a valid transaction, and further, the orderer may send the first digest information to the peer. It may be understood that because the peer has locally stored the transaction correspondence, the peer can obtain the corresponding transaction information based on the transaction correspondence once the peer receives the digest information.

106. The first node device receives the first digest information that is sent by the second node device and that is used to generate a complete blockchain.

In this embodiment, the peer receives the first digest information sent by the orderer, and then determines, based on the locally stored transaction correspondence, the first transaction information corresponding to the first digest information. The peer may generate a corresponding block based on the first transaction information, and then blocks generated by a plurality of peers form a blockchain. It may be understood that in actual application, there are a plurality of manners in which the peer assembles the blockchain. In a first manner, each peer performs assembling, and in a second manner, one peer assembles the blockchain and then broadcasts the blockchain.

Optionally, in the first manner, after the peer receives the first digest information sent by the orderer, the peer first determines, based on the locally stored transaction correspondence, the first transaction information corresponding to the first digest information, and then broadcasts the first transaction information to other peers on a channel the peer has joined. Similarly, when receiving a block that includes only the first digest information, the peer broadcasts the block that includes only the first digest information to another peer on the channel, and each peer is responsible for assembling the complete blockchain. Each peer may further obtain the complete transaction information from a neighboring node based on the first digest information included in the block, and is responsible for assembling the complete blockchain.

Optionally, in the second manner, after the peer receives the first digest information sent by the orderer, the peer first determines, based on the locally stored transaction correspondence, the first transaction information corresponding to the first digest information, and then broadcasts the first transaction information to other peers on a channel the peer has joined. When receiving a block that includes only the first digest information, the peer obtains the complete first transaction information from a neighboring peer based on the first digest information included in the block, assembles the complete blockchain, and then broadcasts the complete blockchain to other peers on the channel.

In this embodiment, the blockchain generation method is provided. The client first sends the first transaction information to the first node device, where the first transaction information includes the first basic information and the first digest information, and the first transaction information is used to instruct the first node device to perform transaction simulation. The client receives the first endorsement result sent by the first node device, where the first endorsement result includes the signature generated after the first node device successfully performs transaction simulation. If the first endorsement result meets the preset transaction condition, the client sends the first digest information and the first endorsement result to the second node device, so that the second node device sends to the first node device, based on the first endorsement result, the first digest information used to generate a complete blockchain. In the foregoing manner, only the digest information is transmitted between the first node device and the second node device, and the digest information is a part of content in the transaction information. Therefore, the second node device does not obtain the complete transaction information, so that information security is improved, and transaction privacy is also protected.

Optionally, based on the foregoing embodiment corresponding to FIG. 5, in a first alternative blockchain generation method provided in an embodiment of the present disclosure, the method may further include:

sending, by the client, second transaction information to the first node device, and receiving, by the first node device, the second transaction information sent by the client, where the second transaction information includes second basic information and second digest information, and the second transaction information is used to instruct the first node device to perform transaction simulation;

performing, by the first node device, transaction simulation based on the second transaction information, to generate a second endorsement result corresponding to the transaction simulation, where the second endorsement result is a signature generated after the first node device successfully performs transaction simulation;

sending, by the first node device, the second endorsement result to the client, and receiving, by the client, the second endorsement result sent by the first node device;

if the second endorsement result meets the preset transaction condition, sending, by the client, the second digest information and the second endorsement result to the second node device;

receiving, by the first node device, the second digest information sent by the second node device based on the second endorsement result;

generating, by the first node device, a complete blockchain based on the second digest information;

determining, by the second node device, a transaction sequence based on the first digest information and the second digest information; and sending, by the second node device, the second digest information to the first node device based on the transaction sequence and the second endorsement result.

In this embodiment, the orderer may further order a plurality of transactions, to ensure a transaction sequence.

It may be understood that a transaction sequence is determined to improve transaction reliability. For example, a user A has a total of ¥100, and at 11:00, a user B requests the user A to transfer ¥80, and at 12:00, a user C requests the user A to transfer ¥50. If a transaction sequence is not considered, the user A first transfers ¥50 to the user C, and remaining money is insufficient to make a transfer to the user B, and consequently, the transfer fails. However, actually, the user B first requests the user A to make a transfer, and transaction fairness is not ensured if the transaction sequence is not considered.

In addition, in this embodiment, the orderer needs to sequentially record received transaction information. The transaction information includes digest information. Because the digest information is unique, the orderer can determine transaction-related information based on the digest information, to obtain a transaction sequence, so that transaction reliability is improved, and a transaction completion success rate is increased.

Figure 6:
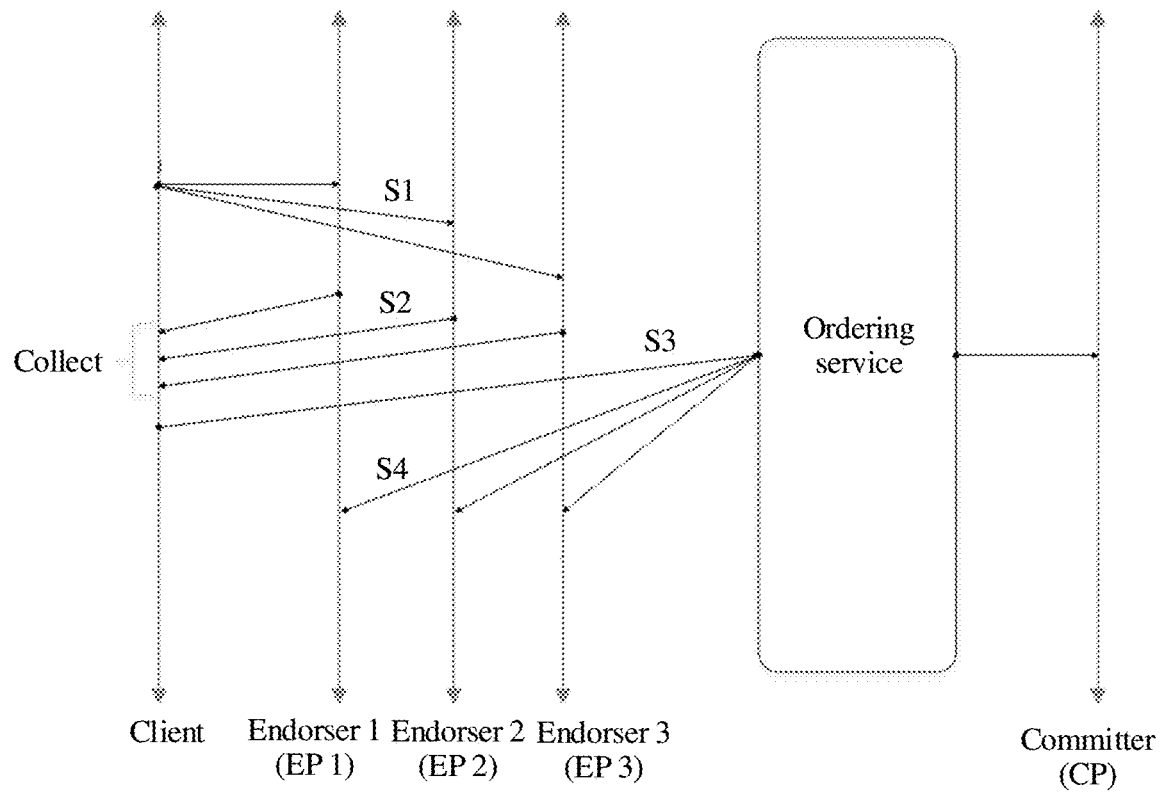
FIG. 6 is a schematic interaction flowchart of a blockchain generation method according to an embodiment of this application.

For ease of description, refer to FIG. 6. FIG. 6 is a schematic interaction flowchart of a blockchain generation method according to an embodiment of this application. As shown in the figure, details are as follows:

In step S1, a client initializes a transaction to generate transaction information (tx). In addition to transaction-related basic information, tx additionally includes digest information of a fixed byte length generated from original tx by using a hash algorithm. Then the client sends re-assembled transaction information (TX) to an endorser for endorsement.

In step S2, the endorser simulates the transaction based on TX, and if the transaction can be successfully conducted, signs the transaction and returns a signature to the client. In addition, the endorser also needs to locally store the transaction. In a feasible storage method, digest information is used as an index and tx is stored as storage content.

In step S3, the client collects a result returned by the endorser. When collecting sufficient endorsement results, the client packages digest information and the endorsement results. In this case, the client does not package complete transactions, but packages only transaction digest information, and then sends the digest information to an orderer for ordering.

In step S4, after receiving the transactions, the orderer sequentially writes the transactions into a blockchain, and then sends a newly generated block to all peers on a channel for synchronization. After receiving the block, the peer first needs to perform verification on the block. In this case, the block includes only transaction digest information. Therefore, the peer needs to perform matching and re-assembling based on the digest information in the block and locally stored complete transaction information, replace the digest information in the block with the complete transaction information, regenerate a complete blockchain, and then correspondingly modify a world state of the peer based on transaction validity.

For ease of understanding, the following describes a blockchain-based transaction with reference to FIG. 7(a) to FIG. 7(d). It is assumed that a transfer is made between a user A and a user B by using the technical solutions provided in this application, the user A initially has ¥100, the user B initially has ¥200, and the user A transfers ¥10 to the user B. An instruction corresponding to the current transaction is as follows:

peer chaincode invoke -o orderer.example.com:7050 -C mychannel -n testcc -c '{"Args":["invoke", "A", "B", "10"]}'

Figure 7A:
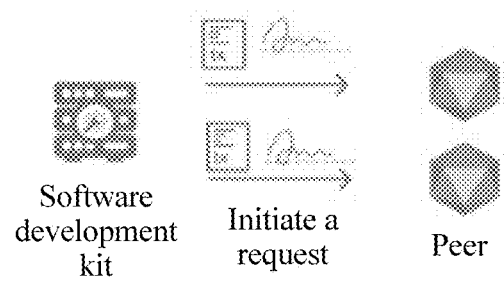
FIG. 7($a$) is a schematic diagram of conducting a transaction based on digest information according to an embodiment of this application.

First refer to FIG. 7(a). FIG. 7(a) is a schematic diagram of conducting a transaction based on digest information in an embodiment of this application. As shown in the figure, when sending a transaction request to a peer by using a client, the user A further needs to send a digest field. Current transaction information tx is as follows:

tx=<clientID, chaincodeID, txPayload, timestamp, clientSig>
txPayload=<"invoke", ["a", "b", "10"], digest> (digest=f (<"invoke", ["a", "b", "10"]>))

Figure 7B:
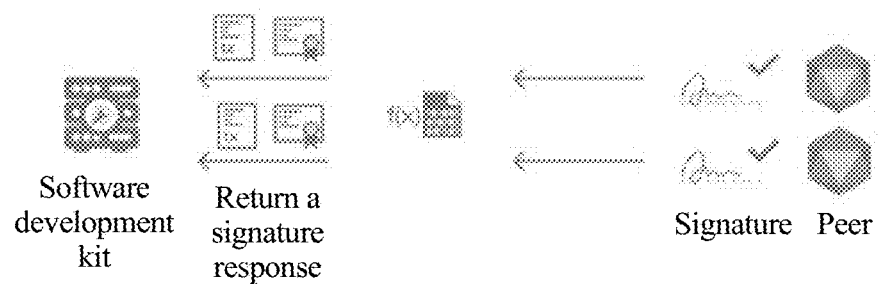

Then refer to FIG. 7(b). FIG. 7(b) is another schematic diagram of conducting a transaction based on digest information in an embodiment of this application. As shown in the figure, the peer stores a transaction, establishes an index based on a digest field, stores the transaction information tx, and then returns a signature response.

Figure 7C:
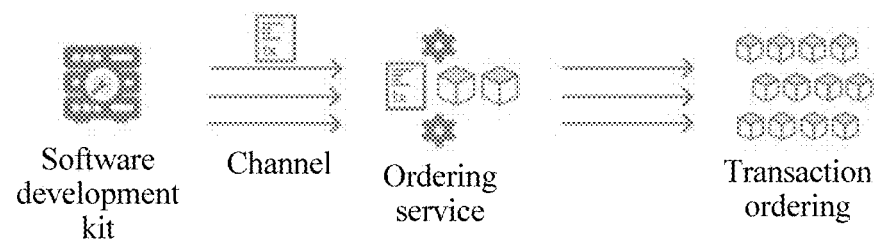

Then refer to FIG. 7(c). FIG. 7(c) is another schematic diagram of conducting a transaction based on digest information in an embodiment of this application. As shown in the figure, the client integrates a digest field (f(proposal)) in the transaction information tx and signature response information, and then sends an integrated message to an orderer. The integrated message sent to the orderer is as follows:

tx+Response=<<clientID, chaincodeID, txPayload, timestamp, clientSig>, Response>txPayload=<digest>(digest=f (<"invoke", ["a", "b", "10"]>))

Figure 7D:
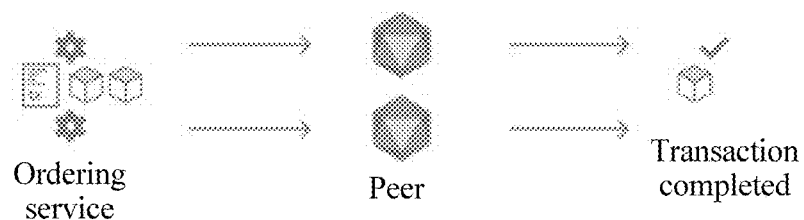

Finally refer to FIG. 7(d). FIG. 7(d) is another schematic diagram of conducting a transaction based on digest information in an embodiment of this application. As shown in the figure, the peer obtains a block from the orderer, and then obtains the local complete transaction information tx by using the digest field (f(proposal)) in the transaction information tx in the block, to re-assemble a blockchain and complete the transaction.

In Embodiment 2, a complete blockchain is generated by using an orderer grouping method.

Figure 8:
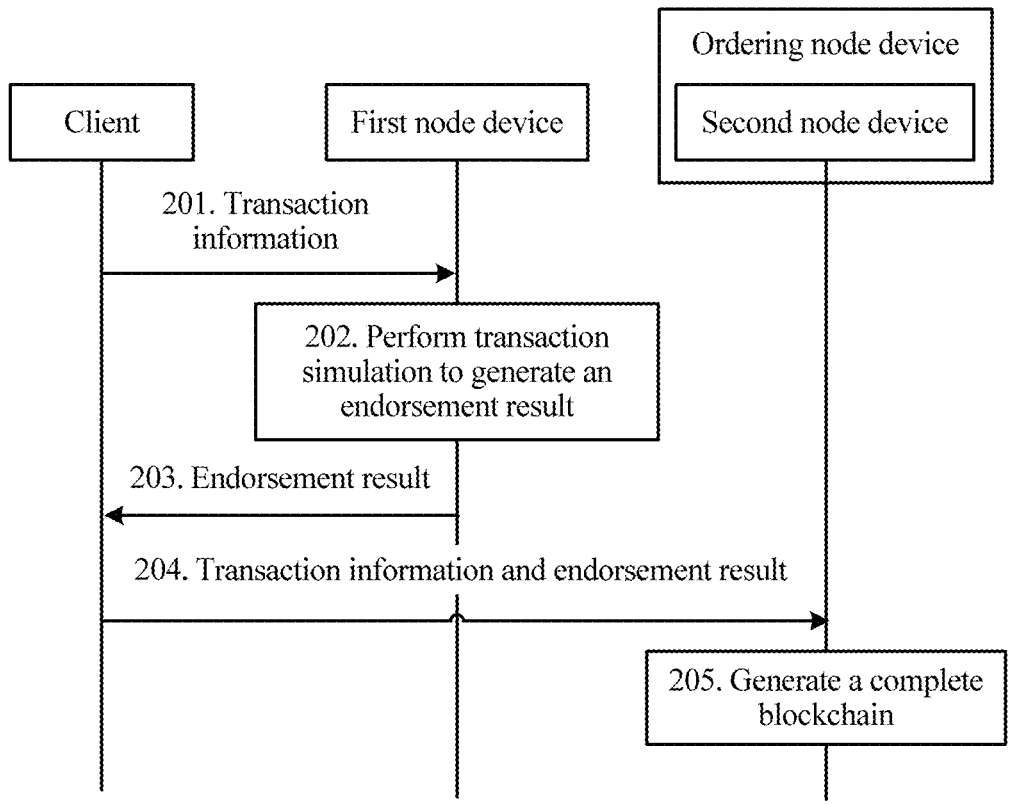
FIG. 8 is a schematic diagram of another example blockchain generation method according to an embodiment according to an embodiment of this application.

FIG. 8 is a schematic diagram of another example blockchain generation method according to an embodiment of this application. The blockchain generation method includes the following steps.

201. A client sends transaction information to a first node device.

In this embodiment, the first node device may be a peer, and a second node device may be an orderer. The client first sends the transaction information to the peer. The transaction information includes transaction data and a transaction object. For example, if a user X initiates a transfer request to a user Y by using a client A, and a transfer amount is 100, transaction objects are "user X" and "user Y", and transaction data is "100".

202. The first node device performs transaction simulation based on the transaction information and generates an endorsement result, where the endorsement result is a signature generated after the transaction simulation succeeds.

In this embodiment, the peer performs transaction simulation based on the received transaction information. Specifically, an endorser in the peer may perform transaction simulation. The transaction simulation means simulating, according to a rule of a smart contract, a process in which a user A makes a transfer to a user B, to predict whether the transfer succeeds. If the transfer succeeds, the endorser signs the transaction and generates an endorsement result.

203. The first node device sends the endorsement result to the client, and the client receives the endorsement result sent by the first node device.

In this embodiment, the peer sends the endorsement result to the client, and the client may receive the endorsement result sent by the peer.

204. If the endorsement result meets a preset transaction condition, the client sends the transaction information and the endorsement result to second node devices.

In this embodiment, if the endorsement result meets the preset transaction condition, the client packages the transaction information and the endorsement result, and then sends the transaction information and the endorsement result to orderers in a same group. The orderer performs ordering. The ordering means recording a transaction sequence. For example, five clients sequentially send transaction requests to the peer, and the orderer sequentially records transaction information sent by the five clients.

It may be understood that before the client sends the packaged transaction information and endorsement result to the orderers, the client further needs to determine orderers belonging to a same group. Generally, there are two determining manners. In a first manner, the orderers belonging to a same group are determined based on an identifier, and in a second manner, the orderers belonging to a same group are determined based on a correspondence.

Optionally, in the first manner, before the client sends the transaction information and the endorsement result to the orderers, a group identifier is obtained from configuration information based on the transaction information. The configuration information may be configuration files. The client locally maintains these configuration files, and may obtain, by using the configuration files, group identifiers corresponding to different orderers, for example, "identifier A". In this case, orderers belonging to "identifier A" belong to a same transaction group. The configuration information is a preset correspondence between transaction information and a group identifier. Table 2 shows an example of the configuration information.

TABLE 2

| Transaction information | Group identifier |
| --- | --- |
| accountA to accountB ¥20 | Identifier A |
| accountA to accountC ¥10 | Identifier B |

TABLE 2-continued

| Transaction information | Group identifier |
|---|---|
| accountB to accountA ¥20 | Identifier A |
| accountB to accountD ¥100 | Identifier C |
| accountB to accountC ¥110 | Identifier D |
| accountC to accountB ¥50 | Identifier D |
| accountC to accountA ¥120 | Identifier B |
| accountC to accountA ¥200 | Identifier B |

It may be understood that the foregoing configuration information is merely an example, and should not be construed as a limitation to embodiments of the present disclosure. The client determines, based on a group identifier, orderers belonging to a same transaction group.

Optionally, in the second manner, before sending the transaction information and the endorsement result to the second node devices, the client obtains a target channel identifier corresponding to the transaction information. The target channel identifier is used to indicate the peer that has a communication connection relationship with the client, and a channel corresponding to the target channel identifier is used to implement data exchange between the client and the peer. Then the client determines, based on a group correspondence, a same transaction group corresponding to the target channel identifier. The group correspondence is a correspondence between a channel identifier and a transaction group. Finally, the client obtains orderers belonging to the same transaction group. In the group correspondence, a group attribute may be added to an orderer, so that different orderers can manage transactions of different channels, thereby protecting privacy. During channel creation, a specific orderer transaction group needs to be specified to provide an ordering service for a channel. An orderer may belong to one or more orderer transaction groups, and can receive only transaction information of channels corresponding to the one or more orderer transaction groups. In principle, there may be a one-to-one or one-to-many relationship between orderer transaction groups and channels.

After an orderer starts, if the orderer needs to provide an ordering service together with another orderer, the orderer first checks an orderer transaction group before being connected to the another orderer. If the orderers are in a same transaction group, the orderers are connected to each other and provide a service together. If the orderer does not need to connect to another orderer to provide a service together with the other orderer, a currently configured orderer transaction group independently provides an ordering service. When creating a channel, the client needs to specify a transaction group to serve the channel. Different clients have different implementation methods. A command line for the client is specifically as follows:

peer channel create -o orderer.example.com:7050 -g base-Group -c mychannel -f./channel-artifacts/channel.tx When performing a chaincode-related operation, the client needs to connect to orderers in a transaction group corresponding to a channel to which the client belongs. Otherwise, the system reports an error.

Figure 9:
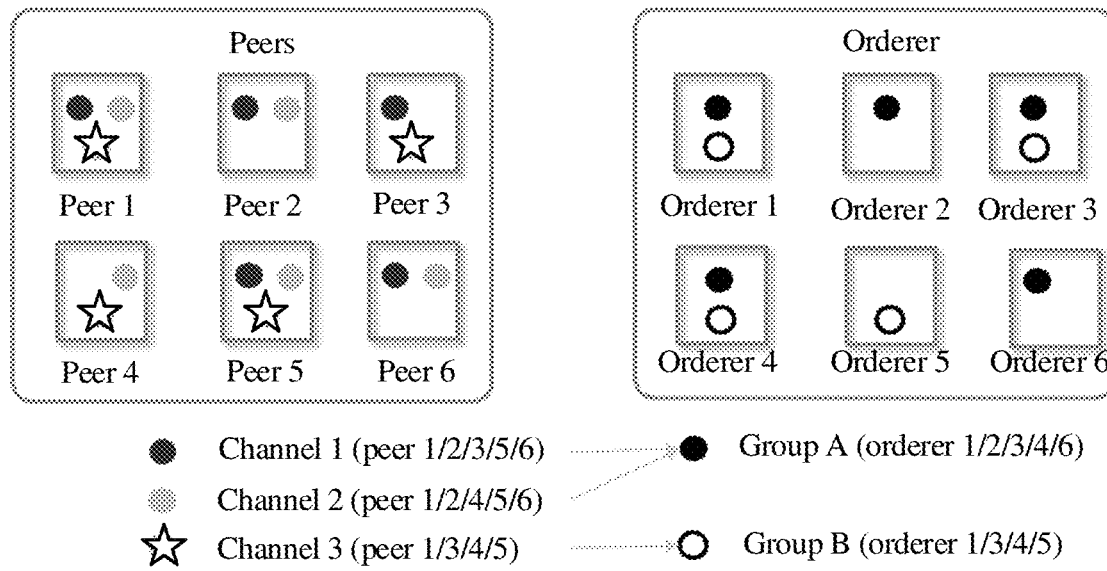
FIG. 9 is a schematic diagram of an example group correspondence according to an embodiment of this application.

For ease of understanding, refer to FIG. 9. FIG. 9 is a schematic diagram of an example group correspondence according to the embodiments of this application. As shown in the figure, the group correspondence is a correspondence between a channel identifier and a transaction group, a channel whose channel identifier is "channel 1" corresponds to "peer 1", "peer 2", "peer 3", "peer 5", and "peer 6", these peers have a correspondence with a group A, and the group A includes "orderer 1", "orderer 2", "orderer 3", "orderer 4", and "orderer 6".

By analogy, a channel whose channel identifier is "channel 2" corresponds to "peer 1", "peer 2", "peer 4", "peer 5", and "peer 6", these peers have a correspondence with the group A, and the group A includes "orderer 1", "orderer 2", "orderer 3", "orderer 4", and "orderer 6".

A channel whose channel identifier is "channel 3" corresponds to "peer 1", "peer 3", "peer 4", and "peer 5", these peers have a correspondence with a group B, and the group B includes "orderer 1", "orderer 3", "orderer 4", and "orderer 5".

205. The second node devices generate a complete blockchain based on the transaction information and the endorsement result, where the second node devices belong to a same transaction group.

In this embodiment, the orderers generate the complete blockchain based on the transaction information and the endorsement result. The blockchain is a chain data structure that includes a plurality of sequentially connected blocks, and is a distributed ledger that is untamperable and unforgeable because of cryptography.

Optionally, if the client detects that the orderers do not belong to a same transaction group, the client automatically generates a prompt message, and notifies, by using the prompt message, a user that an error occurs in a transaction. Therefore, the transaction is not continued.

In this embodiment, transaction information is not received by all orderers, and therefore the transaction information is not leaked to a transaction-unrelated orderer, and transaction privacy is not leaked. In this application, orderers are grouped, so that only an orderer group related to a current transaction is selected to provide an ordering service when the transaction is sent. Therefore, a transaction-unrelated participant is fundamentally prevented from obtaining any transaction information, so that transaction privacy is protected.

Figure 10:
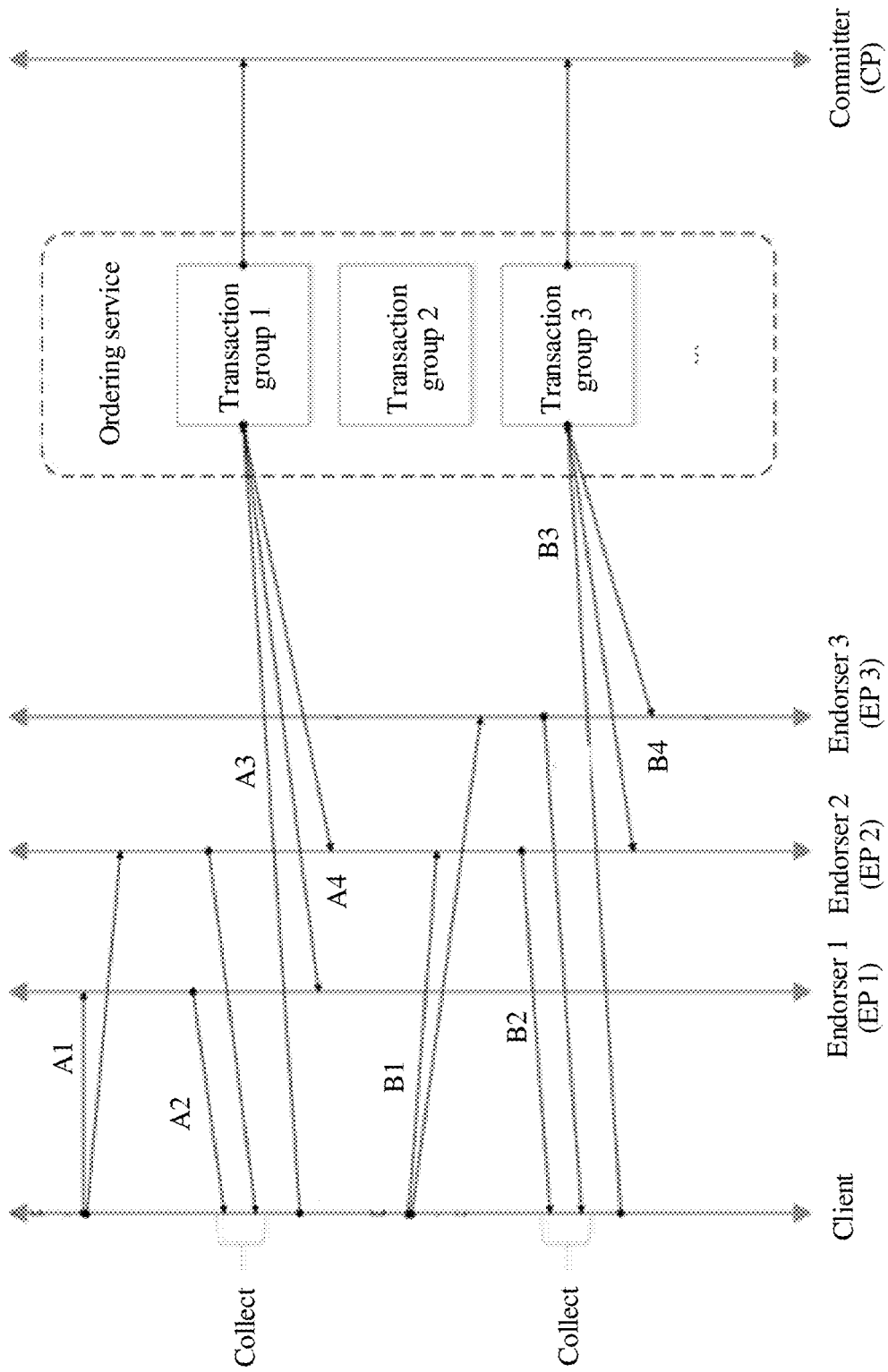
FIG. 10 is another schematic interaction flowchart of an example blockchain generation method according to an embodiment of this application.

For ease of description, refer to FIG. 10. FIG. 10 is another schematic interaction flowchart of a blockchain generation method according to an embodiment of this application. As shown in the figure, details are as follows:

In step A1, a client initializes a transaction to generate transaction information (tx1). In addition to transaction-related basic information, tx1 additionally includes digest information of a fixed byte length generated from original tx1 by using a hash algorithm. Then the client sends re-assembled transaction information (TX1) to an endorser for endorsement.

In step A2, the endorser simulates the transaction based on TX1, and if the transaction can be successfully conducted, signs the transaction and returns a signature to the client.

In step A3, the client collects a result returned by the endorser. When collecting sufficient endorsement results, the client packages the digest information and the endorsement results, and then sends the digest information and the endorsement results to orderers in a transaction group 1. The orderers in the transaction group 1 perform ordering.

In step A4, after receiving transactions, the orderers in the transaction group 1 sequentially write the transactions into a blockchain, and then send a newly generated block to all peers on a channel for synchronization. After receiving the block, the peer needs to perform verification on the block, regenerates a complete blockchain based on locally stored complete TX1, and then correspondingly modifies a world state of the peer based on transaction validity.

In step B1, similarly, in a next transaction, the client first initializes a transaction to generate transaction information (tx2). In addition to transaction-related basic information, tx2 additionally includes digest information of a fixed byte length generated from original tx2 by using a hash algorithm. Then the client sends re-assembled transaction information (TX2) to the endorser for endorsement.

In step B2, the endorser simulates the transaction based on TX2, and if the transaction can be successfully conducted, signs the transaction and returns a signature to the client.

In step B3, the client collects a result returned by the endorser. When collecting sufficient endorsement results, the client packages the digest information and the endorsement results, and then sends the digest information and the endorsement results to orderers in a transaction group 3. The orderers in the transaction group 3 perform ordering (in this case, the transaction corresponding to TX1 precedes the transaction corresponding to TX2).

In step B4, after receiving transactions, the orderers in the transaction group 3 sequentially write the transactions into a blockchain, and then send a newly generated block to all peers on a channel for synchronization. After receiving the block, the peer needs to perform verification on the block, regenerates a complete blockchain based on locally stored complete TX1 and TX2, and then correspondingly modifies a world state of the peer based on transaction validity.

It may be understood that the foregoing application scenario is implemented based on the information segmentation method and the orderer grouping method. If only the orderer grouping method is used, a peer does not need to regenerate a complete blockchain, because transaction information is complete.

Figure 11:
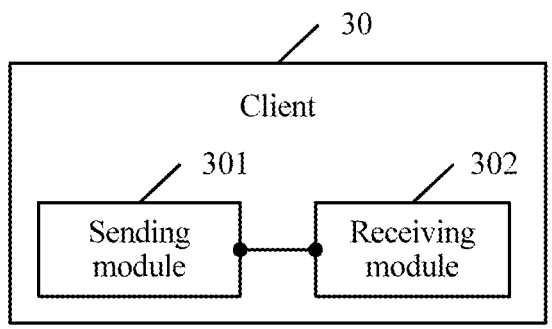
FIG. 11 is a schematic diagram of an example client according to an embodiment of this application.

The following describes in detail a client corresponding to an embodiment of this application. Referring to FIG. 11, a client 30 in this embodiment of this application includes:

a sending module 301, configured to send first transaction information to a first node device, where the first transaction information includes first basic information and first digest information, the first transaction information is used to instruct the first node device to perform transaction simulation, and the first basic information includes transaction data and a transaction object and a receiving module 302, configured to receive a first endorsement result sent by the first node device, where the first endorsement result includes a signature generated after the first node device successfully performs transaction simulation, where the sending module 301 is further configured to: if the first endorsement result received by the receiving module 302 meets a preset transaction condition, send the first digest information and the first endorsement result to a second node device, so that the second node device sends to the first node device, based on the first endorsement result, the first digest information used to generate a complete blockchain.

In this embodiment, the sending module 301 sends the first transaction information to the first node device, where the first transaction information includes the first basic information and the first digest information, the first transaction information is used to instruct the first node device to perform transaction simulation, and the first basic information includes the transaction data and the transaction object. The receiving module 302 receives the first endorsement result sent by the first node device, where the first endorsement result includes the signature generated after the first node device successfully performs transaction simulation. If the first endorsement result received by the receiving module 302 meets the preset transaction condition, the sending module 301 sends the first digest information and the first endorsement result to the second node device, so that the second node device sends to the first node device, based on the first endorsement result, the first digest information used to generate a complete blockchain.

In this embodiment, the client 30 is provided. The client 30 first sends the first transaction information to the first node device, where the first transaction information includes the first basic information and the first digest information, and the first transaction information is used to instruct the first node device to perform transaction simulation. The client 30 receives the first endorsement result sent by the first node device, where the first endorsement result includes the signature generated after the first node device successfully performs transaction simulation. If the first endorsement result meets the preset transaction condition, the client 30 sends the first digest information and the first endorsement result to the second node device, so that the second node device sends to the first node device, based on the first endorsement result, the first digest information used to generate a complete blockchain. In the foregoing manner, only the digest information is transmitted between the first node device and the second node device, and the digest information is a part of content in the transaction information. Therefore, the second node device does not obtain the complete transaction information, so that information security is improved, and transaction privacy is also protected.

Figure 12:
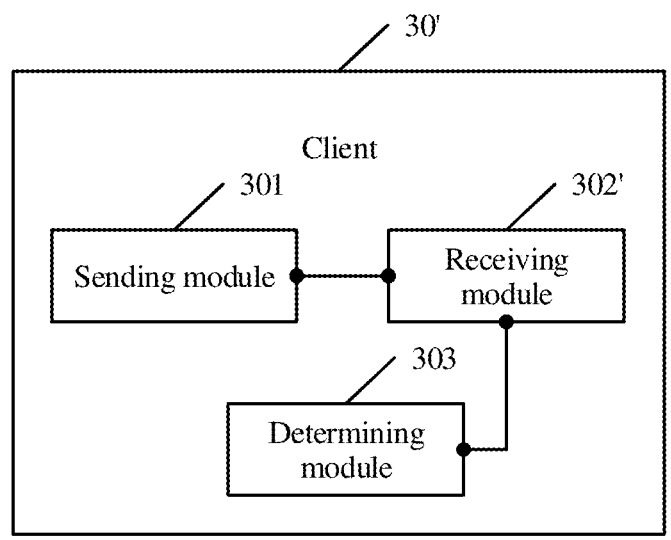
FIG. 12 is a schematic diagram of another example client according to an embodiment of this application.

Optionally, based on the embodiment corresponding to FIG. 11, referring to FIG. 12, in another example client 30' provided in another embodiment of the present disclosure, the client 30' includes sending module 301, a receiving module 302, and a determining module 303.

The receiving module 302' of the client 30' is configured to perform operation(s) similar to those of the receiving module 302 of the client 30 respectively. The receiving module 302' of the client 30' is further configured to receive N first endorsement results sent by N node devices in the first node device, where N is a positive integer greater than 0; and the determining module 303 is configured to: after the receiving module 302' receives the first endorsement result sent by the first node device, if N is greater than or equal to a preset threshold, determine that the first endorsement result meets the preset transaction condition.

It can be learned that in this embodiment, specific content that meets the preset transaction condition is described. The client 30' needs to receive first endorsement results of a quantity that is greater than or equal to the preset threshold. In other words, it is considered that the preset transaction condition is met only when at least N node devices need to send endorsement results to the client 30'. In the foregoing manner, a plurality of node devices provide endorsement results, so that multi-party verification is implemented, thereby improving endorsement reliability.

Optionally, based on the embodiment corresponding to FIG. 11 or FIG. 12, in another example client provided in an embodiment of the present invention, the sending module of the other client is further configured to send second transaction information to the first node device, where the second transaction information includes second basic information and second digest information, and the second transaction information is used to instruct the first node device to perform transaction simulation;

the receiving module of the other client is further configured to receive a second endorsement result sent by the first node device, where the second endorsement result is a signature generated after the first node device successfully performs transaction simulation; and the sending module of the other client is further configured to: if the second endorsement result received by the receiving module meets the preset transaction condition, send the second digest information and the second endorsement result to the second node device, so that the second node device sends, to the first node device based on the second endorsement result, the second digest information used to generate a complete blockchain, and determines, based on the first digest information and the second digest information, a transaction sequence corresponding to a plurality of transactions.

It can be learned that in embodiments of this application, the client may further conduct a plurality of transactions, a plurality of clients are included for a blockchain, and each client conducts a plurality of different transactions. In the foregoing manner, the client can conduct a plurality of transactions based on a user requirement. In a process of each transaction, only digest information is transmitted between the first node device and the second node device, and the digest information is a part of content in transaction information. Therefore, the second node device does not obtain the complete transaction information, so that information security is improved, and transaction privacy is also protected.

Figure 13:
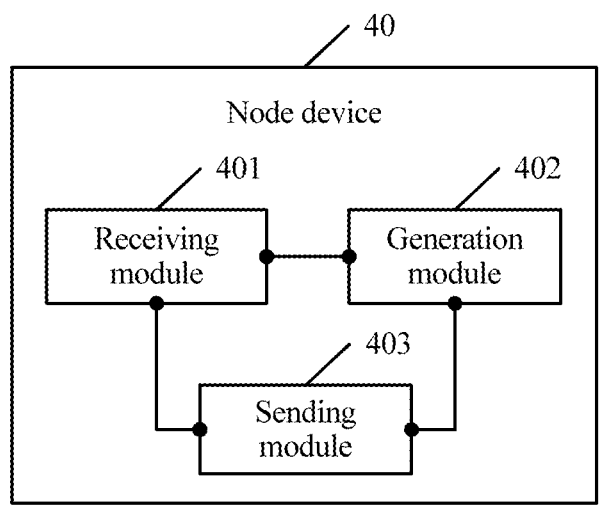
FIG. 13 is a schematic diagram of an example node device according to an embodiment of this application.

The following describes in detail a node device corresponding to an embodiment of this application. Referring to FIG. 13, a node device 40 in this embodiment includes:

a receiving module 401, configured to receive first transaction information sent by a client, where the first transaction information includes first basic information and first digest information, and the first basic information includes transaction data and a transaction object;

a generation module 402, configured to perform transaction simulation based on the first transaction information received by the receiving module 401, to generate a first endorsement result corresponding to the transaction simulation, where the first endorsement result includes a signature generated after the first node device successfully performs transaction simulation; and a sending module 403, configured to send the first endorsement result generated by the generation module 402 to the client, so that the client sends the first digest information and the first endorsement result to a second node device, where the receiving module 401 is further configured to receive the first digest information that is sent by the second node device and that is used to generate a complete blockchain.

In this embodiment, the receiving module 401 receives the first transaction information sent by the client, where the first transaction information includes the first basic information and the first digest information, and the first basic information includes the transaction data and the transaction object. The generation module 402 performs transaction simulation based on the first transaction information received by the receiving module 401, to generate the first endorsement result corresponding to the transaction simulation, where the first endorsement result includes the signature generated after the first node device successfully performs transaction simulation. The sending module 403 sends the first endorsement result generated by the generation module 402 to the client, so that the client sends the first digest information and the first endorsement result to the second node device. The receiving module 401 receives the first digest information that is sent by the second node device and that is used to generate a complete blockchain.

It can be learned that in this embodiment, the first node device is provided. The first node device first receives the first transaction information sent by the client, where the first transaction information includes the first basic information and the first digest information, and the first transaction information is used to instruct the first node device to perform transaction simulation. The first node device performs transaction simulation based on the first transaction information, to generate the first endorsement result corresponding to the transaction simulation. Then the first node device sends the first endorsement result to the client. Finally, the first node device receives the first digest information that is sent by the second node device and that is used to generate a complete blockchain. In the foregoing manner, only the digest information is transmitted between the first node device and the second node device, and the digest information is a part of content in the transaction information. Therefore, the second node device does not obtain the complete transaction information, so that information security is improved, and transaction privacy is also protected.

Figure 14:
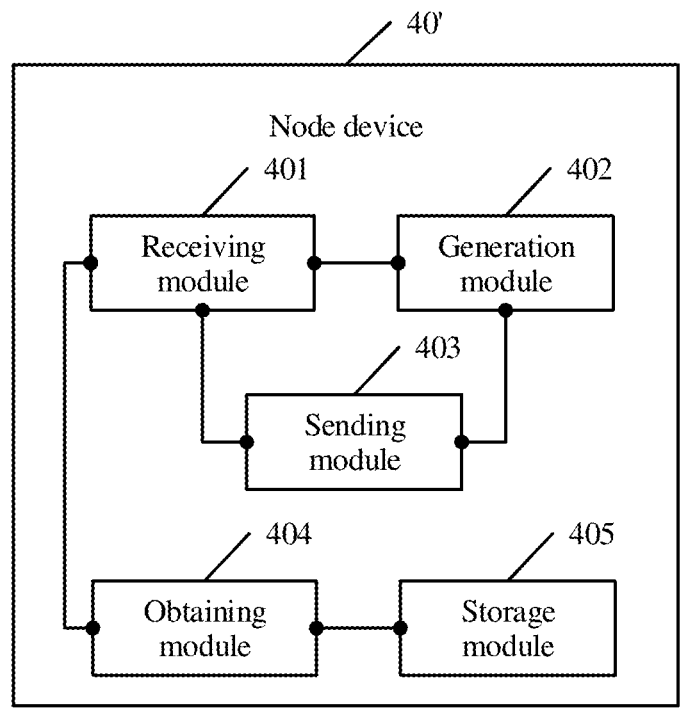
FIG. 14 is a schematic diagram of another example node device according to an embodiment of this application.

Optionally, based on the embodiment corresponding to FIG. 13, referring to FIG. 14, in another example node device 40' provided in an embodiment of the present invention, the node device 40' further includes an obtaining module 404 and a storage module 405.

The obtaining module 404 is configured to: after the receiving module 401' receives the first transaction information sent by the client, obtain a transaction correspondence based on the first transaction information, where the transaction correspondence is used to indicate a correspondence between the first digest information and the first transaction information; and the storage module 405 is configured to store the transaction correspondence obtained by the obtaining module 404.

It can be learned that in this embodiment, the first node device may further obtain the transaction correspondence based on the first transaction information, and locally store the transaction correspondence. In the foregoing manner, the first node device can locally store the transaction correspondence, so that corresponding transaction information can be determined based on digest information, thereby improving feasibility and operability of the solution.

Optionally, based on the embodiment corresponding to FIG. 13 or FIG. 14, in another example node device provided in an embodiment of the present disclosure, the obtaining module of this node device is further configured to: after the receiving module receives the first digest information that is sent by the second node device and that is used to generate a complete blockchain, obtain the first transaction information based on the transaction correspondence and the first digest information, where the transaction correspondence is used to indicate the correspondence between the first digest information and the first transaction information; and the generation module of this node device is further configured to generate a complete blockchain based on the first transaction information obtained by the obtaining module, where the blockchain includes a plurality of blocks, and the blocks are generated by the first node device based on the first transaction information.

It can be learned that in this embodiment, a manner of assembling the blockchain by the first node device is described. To be specific, each first node device obtains the first transaction information based on the transaction correspondence and the first digest information, and may generate the complete blockchain by using the first transaction information. In the foregoing manner, each first node device may assemble the blockchain, and the first node devices do not need to notify each other of the blockchain, so that practicability of the solution is improved.

Optionally, based on the embodiment corresponding to FIG. 13 or FIG. 14, in yet another node device provided in an embodiment of the present invention, the obtaining module of this node device is further configured to: after the receiving module receives the first digest information that is sent by the second node device and that is used to generate a complete blockchain, obtain the first transaction information based on the transaction correspondence and the first digest information, where the transaction correspondence is used to indicate the correspondence between the first digest information and the first transaction information;

the generation module of this node device is further configured to generate a complete blockchain based on the first transaction information obtained by the obtaining module; and the sending module of this node device is further configured to broadcast the complete blockchain generated by the generation module to another first node device that has a same node device function as the first node device.

It can be learned that in this embodiment, another manner of assembling the blockchain by the first node device is described. To be specific, one first node device generates the complete blockchain based on the first transaction information, and then the first node device broadcasts the complete blockchain to another first node device. In the foregoing manner, only one first node device needs to assemble the complete blockchain, so that flexibility and feasibility of the solution are improved.

Optionally, based on the embodiment corresponding to FIG. 13 or FIG. 14, in yet another example node device provided in an embodiment of the present invention, the receiving module of this node device is further configured to: after receiving the first transaction information sent by the client, receive second transaction information sent by the client, where the second transaction information includes second basic information and second digest information;

the generation module of this node device is further configured to perform transaction simulation based on the second transaction information received by the receiving module, to generate a second endorsement result corresponding to the transaction simulation, where the second endorsement result is a signature generated after the first node device successfully performs transaction simulation;

the sending module of this node device is further configured to send the second endorsement result generated by the generation module to the client, so that the client sends the second digest information and the second endorsement result to the second node device if the second endorsement result meets a preset transaction condition; and the receiving module of this node device is further configured to receive the second digest information sent by the second node device based on the second endorsement result, so that the second node device determines a transaction sequence based on the first digest information and the second digest information.

It can be learned that in embodiments of this application, the first node device may further conduct a plurality of transactions, a plurality of clients are included for a blockchain, and each client conducts a plurality of different transactions. In the foregoing manner, the client can conduct a plurality of transactions based on a user requirement. In a process of each transaction, only digest information is transmitted between the first node device and the second node device, and the digest information is a part of content in transaction information. Therefore, the second node device does not obtain the complete transaction information, so that information security is improved, and transaction privacy is also protected.

Figure 15:
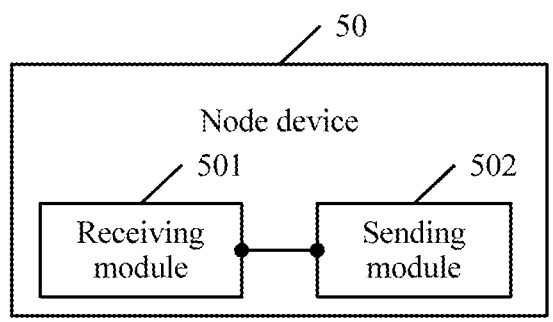
FIG. 15 is a schematic diagram of an example node device according to an embodiment of this application.

The following describes in detail a node device corresponding to an embodiment of this application. Referring to FIG. 15, a node device 50 in an embodiment of this application includes:

a receiving module 501, configured to receive first digest information and a first endorsement result that are sent by a client, where the first endorsement result is a signature generated after a first node device successfully performs transaction simulation, the first digest information belongs to first transaction information, the first transaction information further includes first basic information, and the first basic information includes transaction data and a transaction object; and a sending module 502, configured to send the first digest information to the first node device based on the first endorsement result received by the receiving module 501, so that the first node device generates a complete blockchain based on the first digest information.

In this embodiment, the receiving module 501 receives the first digest information and the first endorsement result that are sent by the client, where the first endorsement result is the signature generated after the first node device successfully performs transaction simulation, the first digest information belongs to the first transaction information, the first transaction information further includes the first basic information, and the first basic information includes the transaction data and the transaction object. The sending module 502 sends the first digest information to the first node device based on the first endorsement result received by the receiving module 501, so that the first node device generates the complete blockchain based on the first digest information.

It can be learned that in this embodiment, the second node device first receives the first digest information and the first endorsement result that are sent by the client, where the first endorsement result is the signature generated after the first node device successfully performs transaction simulation. The second node device sends the first digest information to the first node device based on the first endorsement result, so that the first node device generates the complete blockchain based on the first digest information. In the foregoing manner, only the digest information is transmitted between the first node device and the second node device, and the digest information is a part of content in the transaction information. Therefore, the second node device does not obtain the complete transaction information, so that information security is improved, and transaction privacy is also protected.

Optionally, based on the embodiment corresponding to FIG. 15, in another example node device provided in an embodiment of the present invention, the sending module is further configured to: after the second node device determines, based on the first endorsement result, that a current transaction is a valid transaction, send the first digest information to the first node device.

It can be learned that in this embodiment, the second node device needs to first determine whether the current transaction is a valid transaction, and if the current transaction is a valid transaction, the second node device may send the first digest information to the first node device. In the foregoing manner, reliability of the solution can be improved, and a transaction is conducted on the premise that the transaction is valid, so that practicality of the solution is improved.

Figure 16:
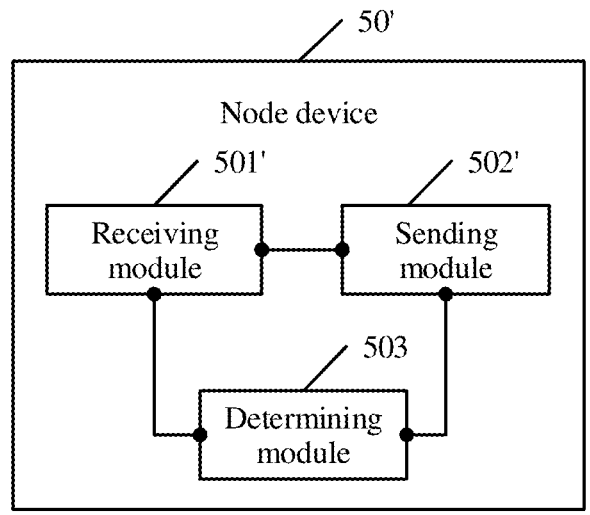
FIG. 16 is a schematic diagram of another example node device according to an embodiment of this application.

Optionally, based on the embodiment corresponding to FIG. 15, referring to FIG. 16, in yet another example node device 50' provided in an embodiment of the present invention, the node device 50' includes a receiving module 501, a sending module 502' and a determining module 503.

The receiving module 501' and the sending module 502' of the node device 50' are configured to perform operation(s) similar to those of the receiving module 501 and sending module 502 of the node device 50. The receiving module 501' of the node device 50' is further configured to: after receiving the first digest information and the first endorsement result that are sent by the client, if a second endorsement result meets a preset transaction condition, receive second digest information and the second endorsement result that are sent by the client, where the second endorsement result is a signature generated after the first node device successfully performs transaction simulation;

the determining module 503 of the node device 50' is configured to determine a transaction sequence based on the first digest information and the second digest information that is received by the receiving module 501'; and the sending module 502' of the node device 50' is further configured to send the second digest information to the first node device based on the transaction sequence determined by the determining module 503 and the second endorsement result, so that the first node device generates a complete blockchain based on the second digest information.

It can be learned that in this embodiment, the second node device determines the transaction sequence based on the first digest information and the second digest information. In an actual application, the transaction sequence may be determined based on a plurality of pieces of digest information. In the foregoing manner, the first node device generates a corresponding blockchain based on a specific transaction sequence, so that feasibility of the solution is improved.

Figure 17:
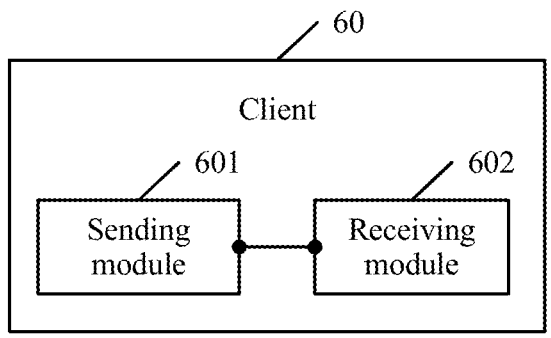
FIG. 17 is a schematic diagram of an example client according to an embodiment of this application.

The following describes in detail a node device corresponding to an embodiment of this application. Referring to FIG. 17, a client 60 in this embodiment of this application includes:

a sending module 601, configured to send transaction information to a first node device; and a receiving module 602, configured to receive an endorsement result sent by the first node device, where the endorsement result is a signature generated after the first node device successfully performs transaction simulation, where the sending module 601 is configured to: if the endorsement result meets a preset transaction condition, send the transaction information and the endorsement result that is received by the receiving module 602 to second node devices, so that the second node devices generate a complete blockchain based on the transaction information and the endorsement result, where the second node devices belong to a same transaction group.

In this embodiment, the sending module 601 sends the transaction information to the first node device, and the receiving module 602 receives the endorsement result sent by the first node device, where the endorsement result is the signature generated after the first node device successfully performs transaction simulation. If the endorsement result meets the preset transaction condition, the sending module 601 sends the transaction information and the endorsement result that is received by the receiving module 602 to the second node devices, so that the second node devices generate the complete blockchain based on the transaction information and the endorsement result, where the second node devices belong to a same transaction group.

In this embodiment, transaction information is not received by all second node devices, and therefore the transaction information is not leaked to a transaction-unrelated second node device, and transaction privacy is not leaked. In this application, second node devices are grouped, so that only a second node device group related to a current transaction is selected to provide an ordering service when the transaction is sent. Therefore, a transaction-unrelated participant is fundamentally prevented from obtaining any transaction information, so that transaction privacy is protected.

Figure 18:
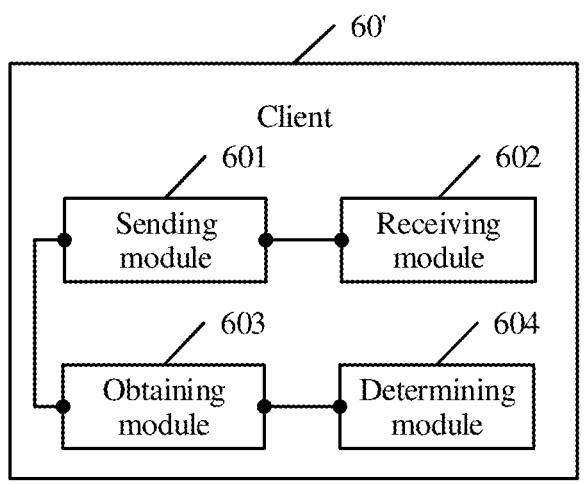
FIG. 18 is a schematic diagram of another example client according to an embodiment of this application.

Optionally, based on the embodiment corresponding to FIG. 17, referring to FIG. 18, in another example client 60' provided in an embodiment of the present invention, the client 60' further includes an obtaining module 603 and a determining module 604.

The obtaining module 603 is configured to: before the sending module 601 sends the transaction information and the endorsement result to the second node devices, obtain a group identifier from configuration information based on the transaction information, where the group identifier is used to indicate second node devices belonging to a same transaction group, and the configuration information is a preset correspondence between transaction information and a group identifier; and the determining module 604 is configured to determine, based on the group identifier obtained by the obtaining module 603, the second node devices belonging to a same transaction group.

It can be learned that in this embodiment, the client may determine, by using a group identifier in configuration information, second node devices of a group to which a current transaction needs to be sent, and a second node device unrelated to the current transaction does not receive related transaction information. In the foregoing manner, transaction privacy can be protected. In addition, second node devices belonging to a same group are determined by using predefined configuration information, so that reliability of the solution can be improved.

Optionally, based on the embodiment corresponding to FIG. 18, in another example client provided in an embodiment of the present invention, the client further includes an obtaining module and a determining module.

The obtaining module of this client is configured to: before the sending module of this client sends the transaction information and the endorsement result to the second node devices, obtain a target channel identifier corresponding to the transaction information, where the target channel identifier is used to indicate the first node device that has a communication connection relationship with the client, and a channel corresponding to the target channel identifier is used for data exchange between the client and the first node device;

the determining module of this client is configured to determine, based on a group correspondence, a same transaction group corresponding to the target channel identifier obtained by the obtaining module of this client, where the group correspondence is a correspondence between a channel identifier and a transaction group; and the obtaining module of this client is configured to obtain second node devices belonging to the same transaction group determined by the determining module of this client.

It can be learned that in this embodiment, the client may obtain the target channel identifier corresponding to the transaction information, and determine, based on the group correspondence, the same transaction group corresponding to the target channel identifier, and therefore obtain the second node devices belonging to the same transaction group. In the foregoing manner, second node devices of a transaction group to which a current transaction needs to be sent can be determined, and a second node device other than the transaction group does not receive related transaction information. In the foregoing manner, transaction privacy can be protected, and flexibility and reliability of the solution are also improved.

Figure 19:
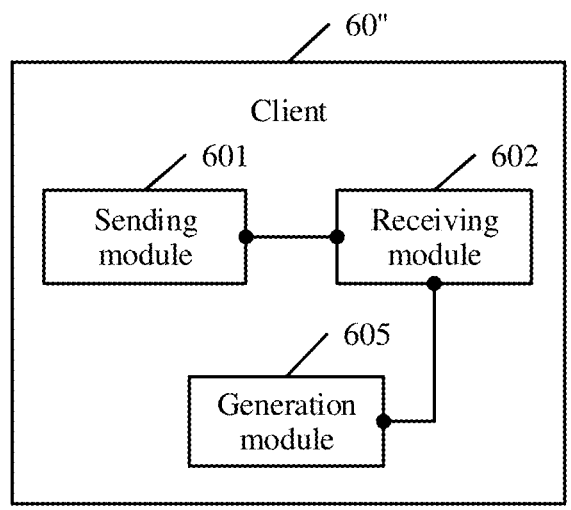
FIG. 19 is a schematic diagram of another example client according to an embodiment of this application.

Optionally, based on the embodiment corresponding to FIG. 17 or FIG. 18, referring to FIG. 19, in another example client 60" provided in an embodiment of the present disclosure, the client 60" further includes a generation module 605.

The generation module 605 is configured to: if the second node devices do not belong to a same transaction group, generate a prompt message, where the prompt message is used to indicate that an error occurs in a transaction.

It can be learned that in this embodiment of this application, if the client detects that the second node devices do not belong to a same transaction group, the client generates the prompt message indicating that an error occurs in the current transaction. In the foregoing manner, the transaction information can be prevented from being sent to second node devices that do not belong to a same transaction group, so that reliability of the solution is improved. In addition, a user can be notified of a transaction error in a timely manner, so that error diagnosis and rectification can be performed in a timely manner.

Figure 20:
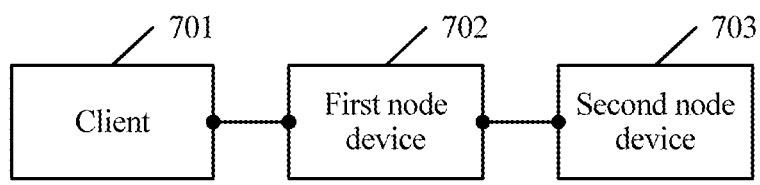
FIG. 20 is a schematic diagram of an example blockchain generation system according to an embodiment of this application.

FIG. 20 is a schematic diagram of an example blockchain generation system according to an embodiment of this application. As shown in the figure, the blockchain generation system includes a client 701, a first node device 702, and a second node device 703.

In this embodiment, the client 701 sends first transaction information to the first node device 702, where the first transaction information includes first basic information and first digest information, and the first basic information includes transaction data and a transaction object. The first node device 702 performs transaction simulation based on the first transaction information, and the first node device 702 sends a first endorsement result to the client 701, where the first endorsement result includes a signature generated after the first node device 702 successfully performs transaction simulation. If the first endorsement result meets a preset transaction condition, the client 701 sends the first digest information and the first endorsement result to the second node device 703, and the second node device 703 sends to the first node device 702, based on the first endorsement result, the first digest information used to generate a complete blockchain.

Figure 21:
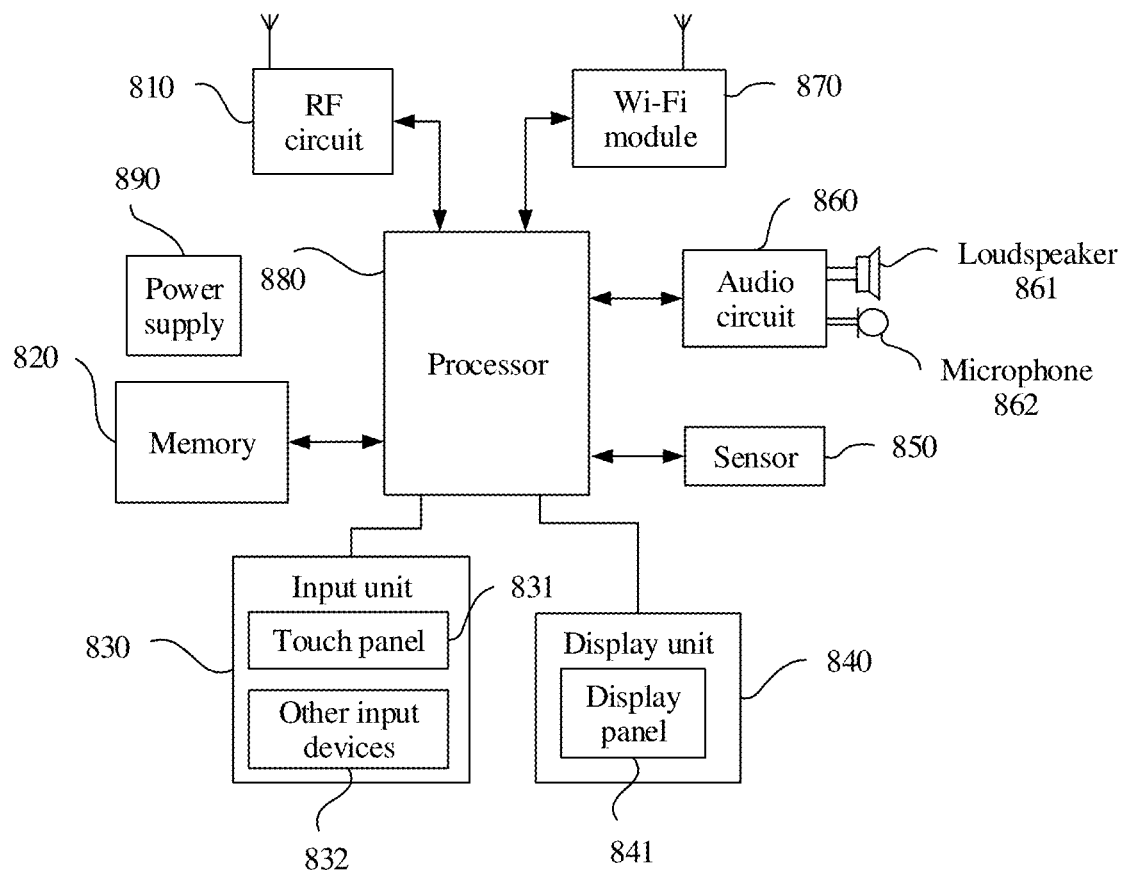
FIG. 21 is a schematic structural diagram of a client according to an embodiment of this application.

An embodiment of the present disclosure further provides another client, as shown in FIG. 21. For ease of description, only a part related to this embodiment is illustrated. For specific technical details that are not disclosed, refer to the above disclosed method embodiments of the present disclosure. The client runs on a terminal, and the terminal may be any terminal device including a mobile phone, a tablet computer, a personal digital assistant (PDA), a point of sales (POS), an in-vehicle computer, and the like. For example, the terminal is a mobile phone.

FIG. 21 is a block diagram of a partial structure of a mobile phone related to the terminal provided in embodiments of the present invention. Referring to FIG. 21, the mobile phone includes components such as a radio frequency (RF) circuit 810, a memory 820, an input unit 830, a display unit 840, a sensor 850, an audio circuit 860, a wireless fidelity (Wi-Fi) module 870, a processor 880, and a power supply 890. Persons skilled in the art may understand that the structure of the mobile phone shown in FIG. 21 does not constitute a limitation on the mobile phone, and the mobile phone may include more or fewer components than those shown in the figure, or a combination of some components, or components differently disposed.

The following describes each component of the mobile phone in detail with reference to FIG. 21.

The RF circuit 810 may be configured to receive and send information, or receive and send a signal in a call process; particularly, after receiving downlink information of a base station, send the downlink information to the processor 880 for processing; and in addition, send related uplink data to the base station. Generally, the RF circuit 810 includes but is not limited to an antenna, at least one amplifier, a transceiver, a coupler, a low noise amplifier (LNA), a duplexer, and the like. In addition, the RF circuit 810 may further communicate with a network and another device through wireless communication. The wireless communication may use any communication standard or protocol, including but not limited to a global system for mobile communications (GSM), a general packet radio service (GPRS), code division multiple access (CDMA), wideband code division multiple access (WCDMA), long term evolution (LTE), an email, a short message service (SMS), and the like.

The memory 820 may be configured to store a software program and a module. The processor 880 performs various functional applications of the mobile phone and processes data by running the software program and the module stored in the memory 820. The memory 820 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 820 may include a high-speed random access memory, and may further include a nonvolatile memory, for example, at least one magnetic disk storage device, a flash storage device, or another volatile solid-state storage device.

The input unit 830 may be configured to: receive entered digital or character information, and generate key signal input related to user setting and function control of the mobile phone. Specifically, the input unit 830 may include a touch panel 831 and other input devices 832. The touch panel 831, also referred to as a touchscreen, may collect a touch operation (for example, an operation performed by a user on the touch panel 831 or near the touch panel 831 by using any proper object or accessory such as a finger or a stylus) of the user on or near the touch panel 831, and drive a corresponding connection apparatus based on a preset program. Optionally, the touch panel 831 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch point coordinates, and sends the touch point coordinates to the processor 880, and can receive and execute a command sent by the processor 880. In addition, the touch panel 831 may be implemented by using a plurality of types such as a resistive type, a capacitive type, an infrared ray, and a surface acoustic wave. In addition to the touch panel 831, the input unit 830 may include the other input devices 832. Specifically, the other input devices 832 may include but are not limited to one or more of a physical keyboard, a function key (such as a volume control key or an on/off key), a trackball, a mouse, a joystick, and the like.

The display unit 840 may be configured to display information entered by the user or information provided for the user, and various menus of the mobile phone. The display unit 840 may include a display panel 841. Optionally, the display panel 841 may be configured in a form such as a liquid crystal display (LCD) or an organic light-emitting diode (OLED). Further, the touch panel 831 may cover the display panel 841. After detecting the touch operation on or near the touch panel 831, the touch panel 831 transmits the touch operation to the processor 880 to determine a type of a touch event. Then the processor 880 provides corresponding visual output on the display panel 841 based on the type of the touch event. In FIG. 21, the touch panel 831 and the display panel 841 are used as two independent components to implement input and output functions of the mobile phone. However, in some embodiments, the touch panel 831 and the display panel 841 may be integrated to implement the input and output functions of the mobile phone.

The mobile phone may further include at least one sensor 850 such as a light sensor, a motion sensor, or another sensor. Specifically, the light sensor may include an ambient light sensor and a proximity sensor. The ambient light sensor may adjust luminance of the display panel 841 based on brightness of ambient light. The proximity sensor may turn off the display panel 841 and/or backlight when the mobile phone moves to an ear. As a type of motion sensor, an accelerometer sensor may detect acceleration magnitudes in all directions (generally, three axes), may detect a magnitude and a direction of gravity in a static state, and may be used in an application for identifying a mobile phone posture (such as screen switching between landscape and portrait modes, a related game, or magnetometer posture calibration), a function related to vibration identification (such as a pedometer or a knock), and the like. For another sensor such as a gyroscope, a barometer, a hygrometer, a thermometer, or an infrared sensor that may be further disposed on the mobile phone, details are not described herein.

The audio circuit 860, a loudspeaker 861, and a microphone 862 may provide an audio interface between the user and the mobile phone. The audio circuit 860 may convert received audio data into an electrical signal, and then transmit the electrical signal to the loudspeaker 861, and the loudspeaker 861 converts the electrical signal into a sound signal for output. In addition, the microphone 862 converts a collected sound signal into an electrical signal. The audio circuit 860 receives the electrical signal, converts the electrical signal into audio data, and then outputs the audio data to the processor 880 for processing. After the processing, the processor 880 sends the audio data to, for example, another mobile phone by using the RF circuit 810, or outputs the audio data to the memory 820 for further processing.

Wi-Fi belongs to a short-distance wireless transmission technology. The mobile phone may help, by using the Wi-Fi module 870, the user receive and send an email, browse a web page, access streaming media, and the like. The Wi-Fi module 870 provides wireless broadband Internet access for the user. Although the Wi-Fi module 870 is shown in FIG. 21, it may be understood that the Wi-Fi module 870 is not a mandatory component of the mobile phone, and may be omitted as required without changing the essence of the present invention.

As a control center of the mobile phone, the processor 880 connects various parts of the entire mobile phone by using various interfaces and lines, and performs various functions of the mobile phone and processes data by running or executing the software program and/or the module stored in the memory 820 and by invoking data stored in the memory 820, to perform overall monitoring on the mobile phone. Optionally, the processor 880 may include one or more processing units. Optionally, an application processor and a modem processor may be integrated into the processor 880. The application processor mainly processes an operating system, a user interface, an application program, and the like. The modem processor mainly processes wireless communication. It may be understood that alternatively, the modem processor may not be integrated into the processor 880.

The mobile phone further includes the power supply 890 (such as a battery) that supplies power to each component. Optionally, the power supply may be logically connected to the processor 880 by using a power management system, to implement functions such as charging and discharging management and power consumption management by using the power management system.

The mobile phone may further include a camera, a bluetooth module, and the like although they are not shown. Details are not described herein.

In this embodiment of the present invention, the processor 880 included in the terminal further has the following functions:

sending first transaction information to a first node device, where the first transaction information includes first basic information and first digest information, the first transaction information is used to instruct the first node device to perform transaction simulation, and the first basic information includes transaction data and a transaction object;

receiving a first endorsement result sent by the first node device, where the first endorsement result includes a signature generated after the first node device successfully performs transaction simulation; and if the first endorsement result meets a preset transaction condition, sending the first digest information and the first endorsement result to a second node device, so that the second node device sends to the first node device, based on the first endorsement result, the first digest information used to generate a complete blockchain.

Optionally, the processor 880 is further configured to perform the following steps:

receiving N first endorsement results sent by N node devices in the first node device, where N is a positive integer greater than 0; and if N is greater than or equal to a preset threshold, determining that the first endorsement result meets the preset transaction condition.

Optionally, the processor 880 is further configured to perform the following steps:

sending second transaction information to the first node device, where the second transaction information includes second basic information and second digest information, and the second transaction information is used to instruct the first node device to perform transaction simulation;

receiving a second endorsement result sent by the first node device, where the second endorsement result is a signature generated after the first node device successfully performs transaction simulation; and if the second endorsement result meets the preset transaction condition, sending the second digest information and the second endorsement result to the second node device, so that the second node device sends, to the first node device based on the second endorsement result, the second digest information used to generate a complete blockchain, and determines, based on the first digest information and the second digest information, a transaction sequence corresponding to a plurality of transactions.

In another embodiment of the present invention, the processor 880 included in the terminal further has the following functions:

sending transaction information to a first node device;

receiving an endorsement result sent by the first node device, where the endorsement result is a signature generated after the first node device successfully performs transaction simulation; and if the endorsement result meets a preset transaction condition, sending the transaction information and the endorsement result to second node devices, so that the second node devices generate a complete blockchain based on the transaction information and the endorsement result, where the second node devices belong to a same transaction group.

Optionally, the processor 880 is further configured to perform the following steps:

obtaining a group identifier from configuration information based on the transaction information, where the group identifier is used to indicate second node devices belonging to a same transaction group, and the configuration information is a preset correspondence between transaction information and a group identifier; and determining, based on the group identifier, the second node devices belonging to a same transaction group.

Optionally, the processor 880 is further configured to perform the following steps:

obtaining a target channel identifier corresponding to the transaction information, where the target channel identifier is used to indicate the first node device that has a communication connection relationship with the client, and a channel corresponding to the target channel identifier is used for data exchange between the client and the first node device;

determining, based on a group correspondence, a same transaction group corresponding to the target channel identifier, where the group correspondence is a correspondence between a channel identifier and a transaction group; and obtaining second node devices belonging to the same transaction group.

Optionally, the processor 880 is further configured to perform the following step:

if the second node devices do not belong to a same transaction group, generating a prompt message, where the prompt message is used to indicate that an error occurs in a transaction.

Figure 22:
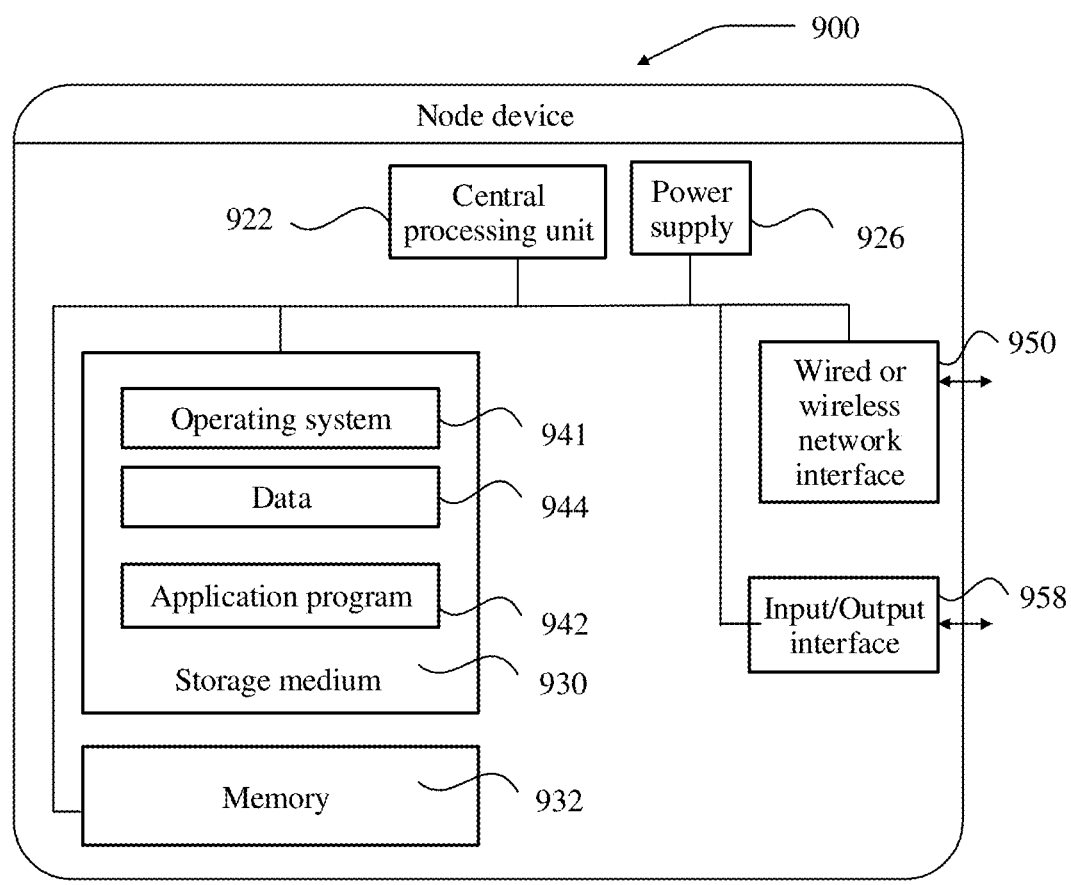
FIG. 22 is a schematic structural diagram of a node device according to an embodiment of this application.

FIG. 22 is a schematic structural diagram of a node device 900 according to an embodiment of the present invention. The node device 900 may vary greatly because of different configurations or performance. The node device 900 may include one or more central processing units (CPU) 922 (for example, one or more processors), one or more memories 932, and one or more storage media 930 (for example, one or more mass storage devices) for storing application programs 942 or data 944. The memory 932 and the storage medium 930 may be used for temporary storage or permanent storage. The program stored in the storage medium 930 may include one or more modules (not shown in the figure), and each module may include a series of instruction operations for the server. Further, the central processing unit 922 may be configured to communicate with the storage medium 930 to perform, on the node device 900, a series of instruction operations in the storage medium 930.

The node device 900 may further include one or more power supplies 926, one or more wired or wireless network interfaces 950, one or more input/output interfaces 958, and/or one or more operating systems 941 such as Windows Server™, Mac OS X™, Unix™, Linux™, and FreeBSD™.

Steps performed by the server in the foregoing embodiment may be based on the server structure shown in FIG. 22.

The CPU 922 may be configured to perform the following steps:

receiving first transaction information sent by a client, where the first transaction information includes first basic information and first digest information, and the first basic information includes transaction data and a transaction object;

performing transaction simulation based on the first transaction information, to generate a first endorsement result corresponding to the transaction simulation, where the first endorsement result includes a signature generated after the first node device successfully performs transaction simulation;

sending the first endorsement result to the client, so that the client sends the first digest information and the first endorsement result to a second node device; and receiving the first digest information that is sent by the second node device and that is used to generate a complete blockchain.

Optionally, the CPU 922 is further configured to perform the following steps:

obtaining a transaction correspondence based on the first transaction information, where the transaction correspondence is used to indicate a correspondence between the first digest information and the first transaction information; and storing the transaction correspondence.

Optionally, the CPU 922 is further configured to perform the following steps:

obtaining the first transaction information based on the transaction correspondence and the first digest information, where the transaction correspondence is used to indicate the correspondence between the first digest information and the first transaction information; and generating a complete blockchain based on the first transaction information, where the blockchain includes a plurality of blocks, and the blocks are generated by the first node device based on the first transaction information.

Optionally, the CPU 922 is further configured to perform the following steps:

obtaining the first transaction information based on the transaction correspondence and the first digest information, where the transaction correspondence is used to indicate the correspondence between the first digest information and the first transaction information;

generating a complete blockchain based on the first transaction information; and broadcasting the complete blockchain to another first node device that has a same node device function as the first node device.

Optionally, the CPU 922 is further configured to perform the following steps:

receiving second transaction information sent by the client, where the second transaction information includes second basic information and second digest information;

performing transaction simulation based on the second transaction information, to generate a second endorsement result corresponding to the transaction simulation, where the second endorsement result is a signature generated after the first node device successfully performs transaction simulation;

sending the second endorsement result to the client, so that the client sends the second digest information and the second endorsement result to the second node device if the second endorsement result meets a preset transaction condition; and receiving the second digest information sent by the second node device based on the second endorsement result, so that the second node device determines a transaction sequence based on the first digest information and the second digest information.

The CPU 922 may be configured to perform the following steps:

receiving first digest information and a first endorsement result that are sent by a client, where the first endorsement result is a signature generated after a first node device successfully performs transaction simulation, the first digest information belongs to first transaction information, the first transaction information further includes first basic information, and the first basic information includes transaction data and a transaction object; and sending the first digest information to the first node device based on the first endorsement result, so that the first node device generates a complete blockchain based on the first digest information.

Optionally, the CPU 922 is further configured to perform the following step:

after the second node device determines, based on the first endorsement result, that a current transaction is a valid transaction, sending the first digest information to the first node device.

The CPU 922 may be further configured to perform the following steps:

if a second endorsement result meets a preset transaction condition, receiving second digest information and the second endorsement result that are sent by the client, where the second endorsement result is a signature generated after the first node device successfully performs transaction simulation;

determining a transaction sequence based on the first digest information and the second digest information; and sending the second digest information to the first node device based on the transaction sequence and the second endorsement result, so that the first node device generates a complete blockchain based on the second digest information.

All or some of the foregoing embodiments may be implemented by using software, hardware, firmware, or any combination thereof. When the software is used to implement the embodiments, all or some of the embodiments may be implemented in a form of a computer program product.

The computer program product includes one or more computer instructions. When the computer program instructions are loaded and executed on a computer, all or some of the procedures or functions in the embodiments of the present invention are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division, and there may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A blockchain generation method implemented by a client, comprising:

sending first transaction information to a first node device, wherein the first transaction information comprises first basic information and first digest information about a first transaction, the first transaction information instructs the first node device to perform a first simulating transaction that simulates the first transaction, and the first basic information comprises transaction data and a transaction object of the first transaction;

receiving a first endorsement result sent by the first node device, wherein the first endorsement result comprises a signature generated after the first simulating transaction succeeds;

determining whether the first endorsement result meets a transaction condition; and in response to the determination that the first endorsement result meets the transaction condition, sending the first digest information and the first endorsement result to a second node device, so that the second node device sends to the first node device, based on the first endorsement result, the first digest information used to generate a blockchain.

2. The method according to claim 1, wherein receiving the first endorsement result sent by the first node device comprises:

receiving N first endorsement results sent by N node devices of the first node device, wherein N is a positive integer; and the method further comprises, after receiving the first endorsement result sent by the first node device:

determining whether N is greater than or equal to a threshold, and in response to the determination that N is greater than or equal to the threshold, determining that the first endorsement result meets the transaction condition.

3. The method according to claim 1, further comprising:

sending second transaction information to the first node device, wherein the second transaction information comprises second basic information and second digest information a out, a second transaction, and the second transaction information instructs the first node device to perform a second simulating transaction that simulates the second transaction;

receiving a second endorsement result sent by the first node device, wherein the second endorsement result is a signature generated after the second simulating transaction succeeds;

determining whether the second endorsement result meets the transaction condition; and in response to the determination that the second endorsement result meets the transaction condition, sending the second digest information and the second endorsement result to the second node device, so that the second node device sends to the first node device, based on the second endorsement result, the second digest information used to generate a blockchain, and determines, based on the first digest information and the second digest information, a transaction sequence corresponding to a plurality of transactions.

4. A blockchain generation method implemented by a first node device, comprising:

receiving first transaction information sent by a client, wherein the first transaction information comprises first basic information and first digest information about a first transaction, and the first basic information comprises transaction data and a transaction object of the first transaction;

performing a first simulating transaction that simulates the first transaction based on the first transaction information, to generate a first endorsement result corresponding to the first transaction simulation, wherein the first endorsement result comprises a signature generated after the first simulating transaction succeeds;

sending the first endorsement result to the client, so that the client sends the first digest information and the first endorsement result to a second node device; and receiving the first digest information sent by the second node device, the first digest information being used to generate a blockchain.

5. The method according to claim 4, further comprising, after receiving the first transaction information sent by the client:

obtaining a transaction correspondence based on the first transaction information, wherein the transaction correspondence indicates a correspondence between the first digest information and the first transaction information; and storing the transaction correspondence.

6. The method according to claim 4, further comprising, after receiving the first digest information sent by the second node device:

obtaining the first transaction information based on a transaction correspondence and the first digest information, wherein the transaction correspondence indicates a correspondence between the first digest information and the first transaction information; and generating a blockchain based on the first transaction information, wherein the blockchain comprises a plurality of blocks, and the blocks are generated by the first node device based on the first transaction information.

7. The method according to claim 4, further comprising, after receiving the first digest information sent by the second node device:

obtaining the first transaction information based on a transaction correspondence and the first digest information, wherein the transaction correspondence indicates a correspondence between the first digest information and the first transaction information;

generating a blockchain based on the first transaction information; and broadcasting the blockchain to another node device that has a same function as the first node device.

8. The method according to claim 4, further comprising, after receiving the first transaction information sent by the client:

receiving second transaction information sent by the client, wherein the second transaction information comprises second basic information and second digest information about a second transaction;

performing a second simulating transaction that simulates the second transaction based on the second transaction information, to generate a second endorsement result corresponding to the second simulating transaction, wherein the second endorsement result is a signature generated after the second simulating transaction succeeds;

determining whether the second endorsement result meets a transaction condition;

sending the second endorsement result to the client, so that the client sends the second digest information and the second endorsement result to the second node device in response to the determination that the second endorsement result meets the transaction condition; and receiving the second digest information sent by the second node device based on the second endorsement result, so that the second node device determines a transaction sequence based on the first digest information and the second digest information.

9. A blockchain generation method implemented by a client, comprising:
sending transaction information about a first transaction to a first node device;
receiving an endorsement result sent by the first node device, wherein the endorsement result is a signature generated after a simulating transaction performed by the first node device succeeds, and the simulating transaction simulates the first transaction;
determining whether the endorsement result meets a transaction condition; and
in response to the determination that the endorsement result meets the transaction condition, sending the transaction information and the endorsement result to a plurality of second node devices, so that the plurality of second node devices generates a blockchain based on the transaction information and the endorsement result, wherein the plurality of second node devices belongs to a same transaction group.

10. The method according to claim 9, further comprising, before sending the transaction information and the endorsement result to the plurality of second node devices:
obtaining a group identifier from configuration information based on the transaction information, wherein the group identifier indicates the plurality of second node devices belonging to the same transaction group, and the configuration information comprises a correspondence between the transaction information and the group identifier; and
determining based on the group identifier, the plurality of second node devices belonging to the same transaction group.

11. The method according to claim 9, further comprising, before sending the transaction information and the endorsement result to the plurality of second node devices:
obtaining a target channel identifier corresponding to the transaction information, wherein the target channel identifier indicates the first node device that has a communication connection relationship with the client, and a channel corresponding to the target channel identifier is used for data exchange between the client and the first node device;
determining based on a group correspondence, the same transaction group corresponding to the target channel identifier, wherein the group correspondence is a correspondence between the target channel identifier and the same transaction group; and
obtaining the plurality of second node devices belonging to the same transaction group.

12. The method according to claim 9, further comprising:
determining whether the plurality of second node devices does not belong to a same transaction group,
in response to the determination that the plurality of second node devices not belong to a same transaction group, generating a prompt message indicating that an error occurs in a transaction.

13. A client, comprising a memory storing a program, a transceiver, at least one processor, and a bus system, wherein the transceiver is configured to receive or send information under the control of the at least one processor, the bus system is configured to connect the memory, the transceiver, and the at least one processor, so that the memory, the transceiver, and the at least one processor communicate with each other, and the program, when executed by the at least one processor, causes the client to execute operations comprising:
sending first transaction information to a first node device, wherein the first transaction information comprises first basic information and first digest information about a first transaction, the first transaction information instructs the first node device to perform a first simulating transaction that simulates the first transaction, and the first basic information comprises transaction data and a transaction object of the first transaction;
receiving a first endorsement result sent by the first node device, wherein the first endorsement result comprises a signature generated after the first simulating transaction succeeds;
determining whether the first endorsement result meets a transaction condition; and
in response to the determination that the first endorsement result meets the transaction condition, sending the first digest information and the first endorsement result to a second node device, so that the second node device sends to the first node device, based on the first endorsement result, the first digest information used to generate a blockchain.

14. The client according to claim 13, wherein the operations further comprise:
receiving N first endorsement results sent by N node devices of the first node device, wherein N is a positive integer; and
after receiving the first endorsement result sent by the first node device, determining that the first endorsement result meets the transaction condition when N is greater than or equal to a threshold.

15. The client according to claim 13, wherein the operations further comprise:
sending second transaction information to the first node device, wherein the second transaction information comprises second basic information and second digest information about a second transaction, and the second transaction information instructs the first node device to perform a second simulating transaction that simulates the second transaction;
receiving a second endorsement result sent by the first node device, wherein the second endorsement result is a signature generated after the second simulating transaction succeeds;
determining whether the second endorsement result meets the transaction condition; and
in response to the determination that the second endorsement result meets the transaction condition, sending the second digest information and the second endorsement result to the second node device, so that the second node device sends to the first node device, based on the second endorsement result, the second digest information used to generate a blockchain, and determines, based on the first digest information and the second digest information, a transaction sequence corresponding to a plurality of transactions.

* * * * *

UNITED STATES PATENT AND TRADEMARK OFFICE
CERTIFICATE OF CORRECTION

PATENT NO. : 11,902,450 B2
APPLICATION NO. : 16/992455
DATED : February 13, 2024
INVENTOR(S) : Xun Liu It is certified that error appears in the above-identified patent and that said Letters Patent is hereby corrected as shown below:

In the Claims

Column 43, Claim 3, Line 5, change "a out," to --about--; and

Column 46, Claim 12, Line 5, change "devices not," to --devices does not--.

Signed and Sealed this
Fifth Day of March, 2024

Katherine Kelly Vidal
*Director of the United States Patent and Trademark Office*